US009003179B2

(12) United States Patent
Fang et al.

(10) Patent No.: US 9,003,179 B2
(45) Date of Patent: Apr. 7, 2015

(54) WIRELESS INTERNET ACCESS MODULE, COMMUNICATION METHOD FOR HOST AND WIRELESS INTERNET ACCESS MODULE, AND DATA CARD

(71) Applicant: Huawei Device Co., Ltd., Shenzhen (CN)

(72) Inventors: Xiaozhi Fang, Shenzhen (CN); Guiying Xue, Shenzhen (CN); Lei Lin, Shenzhen (CN); Wenchun Jiang, Shenzhen (CN); Meiwen Yang, Shenzhen (CN); Keqiang Gao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 174 days.

(21) Appl. No.: 13/659,659

(22) Filed: Oct. 24, 2012

(65) Prior Publication Data

US 2013/0055353 A1 Feb. 28, 2013

Related U.S. Application Data

(63) Continuation of application No. 13/658,677, filed on Oct. 23, 2012, which is a continuation of application No. PCT/CN2011/000714, filed on Apr. 25, 2011.

(30) Foreign Application Priority Data

Apr. 23, 2010 (CN) .......................... 2010 1 0154212
Jun. 3, 2010 (CN) .......................... 2010 1 0193917
Jun. 3, 2010 (CN) .......................... 2010 1 0193929
Jun. 3, 2010 (CN) .......................... 2010 1 0193948
Jun. 3, 2010 (CN) .......................... 2010 1 0193967

(51) Int. Cl.
*G06F 21/00* (2013.01)
*G06F 3/06* (2006.01)

(Continued)

(52) U.S. Cl.
CPC ............ *G06F 3/0662* (2013.01); *G06F 3/0664* (2013.01); *G06F 3/08* (2013.01);
(Continued)

(58) Field of Classification Search
USPC ................................................. 713/151
See application file for complete search history.

(56) References Cited

U.S. PATENT DOCUMENTS 6,484,943 B1 * 11/2002 Reber et al. .............. 235/462.15
6,760,804 B1    7/2004 Hunt et al.
(Continued)

FOREIGN PATENT DOCUMENTS

CN    1700644 A    11/2005
CN    101192133 A    6/2008
(Continued)

OTHER PUBLICATIONS

Extended European Search Report received in Application No. 12192658.8-1853 mailed Sep. 12, 2013, 11 pages.
(Continued)

*Primary Examiner* — Yogesh Paliwal
(74) *Attorney, Agent, or Firm* — Slater & Matsil, L.L.P.

(57) ABSTRACT

A communication method for a host and a wireless Internet access module, and a data card, are provided so that the host implements wireless Internet access with the wireless Internet access module of a secure digital interface. The method includes simulating each port on a wireless Internet access processing function unit in a wireless Internet access module into a secure digital card partition and reporting the secure digital card partition to a host side; receiving downlink interaction information from the host side encapsulated in a secure digital card interface format, decapsulating the downlink interaction information, and delivering the decapsulated downlink interaction information to a corresponding port; and receiving uplink interaction information reported to the host side from each port, encapsulating the received uplink interaction information in the secure digital card interface format.

14 Claims, 16 Drawing Sheets

(51) Int. Cl.
- *G06F 3/08* (2006.01)
- *G06F 13/10* (2006.01)
- *G06F 13/00* (2006.01)
- *G06K 19/07* (2006.01)
- *H04L 12/24* (2006.01)

(52) U.S. Cl.
CPC ............ *G06F 13/10* (2013.01); *G06F 13/102* (2013.01); *G06F 13/00* (2013.01); *G06K 19/0723* (2013.01); *G06F 3/06* (2013.01); *G06F 3/0632* (2013.01); *G06F 3/0644* (2013.01); *G06F 3/0655* (2013.01); *G06F 3/0659* (2013.01); *G06F 3/0665* (2013.01); *H04L 41/0893* (2013.01); *G06F 2213/3804* (2013.01)

(56) References Cited

U.S. PATENT DOCUMENTS

| | | | |
|---|---|---|---|
| 2002/0039325 A1 | 4/2002 | Aizawa | |
| 2003/0088868 A1* | 5/2003 | Chang et al. | 717/173 |
| 2003/0128272 A1 | 7/2003 | Clough et al. | |
| 2006/0026338 A1 | 2/2006 | Ebara et al. | |
| 2006/0268801 A1 | 11/2006 | Morita | |
| 2007/0073937 A1 | 3/2007 | Feinberg et al. | |
| 2008/0195797 A1* | 8/2008 | Sherman et al. | 711/103 |
| 2009/0199283 A1* | 8/2009 | Jain | 726/7 |

FOREIGN PATENT DOCUMENTS

| | | |
|---|---|---|
| CN | 201081781 Y | 7/2008 |
| CN | 101282367 A | 10/2008 |
| CN | 101420757 A | 4/2009 |
| CN | 201355841 Y | 12/2009 |
| CN | 101686269 A | 3/2010 |
| CN | 101835282 A | 9/2010 |
| CN | 101860440 A | 10/2010 |
| CN | 101860989 A | 10/2010 |
| CN | 101868049 A | 10/2010 |
| CN | 101938848 A | 1/2011 |
| EP | 1 826 679 A1 | 8/2007 |
| EP | 2 456 280 A1 | 5/2012 |
| JP | 2002091709 | 3/2002 |
| JP | 2003-8589 A | 1/2003 |
| JP | 2004-178535 A | 6/2004 |
| JP | 2004-208245 A | 7/2004 |
| JP | 2004-334471 A | 11/2004 |
| JP | 2005275653 A | 10/2005 |
| JP | 2009252109 A | 10/2005 |
| JP | 2006217516 A | 8/2006 |
| JP | 2009-17306 A | 8/2009 |
| WO | WO 2008/002781 A1 | 1/2008 |
| WO | WO 2008/067432 A1 | 6/2008 |

OTHER PUBLICATIONS

"Digital cellular telecommunications system (Phase 2+); AT command set for GSM Mobile Equipment (ME) (GSM 07.07 version 7.4.0 Release 1998)," Global System for Mobile Communications, Technical Specification, ETSI TS 100 916, V7.4.0, Nov. 1999, 126 pages.

Chinese Search Report of Chinese Application No. 201010154212.7 mailed Apr. 23, 2010, 13 pages. (Partial Translation).

First Chinese Office Action of Chinese Application No. 201010193929.2 mailed Feb. 25, 2011, 8 pages. (Partial Translation).

First Chinese Office Action of Chinese Application No. 201010154212.7 mailed Apr. 14, 2011, 11 pages. (Partial Translation).

First Chinese Office Action of Chinese Application No. 201010193967.8 mailed Aug. 18, 2011, 11 pages. (Partial Translation).

Second Chinese Office Action of Chinese Application No. 201010154212.7 mailed Sep. 22, 2011, 12 pages. (Partial Translation).

International Search Report received in International Application No. PCT/CN2011/000714 mailed Aug. 11, 2011, 6 pages.

Written Opinion of the International Searching Authority received in International Application No. PCT/CN2011/000714 mailed Aug. 11, 2011, 5 pages.

Notice of Reasons for Rejection received in Patent Application No. 2011-125181, mailed Feb. 12, 2013, 4 pages.

Decision of Refusal received in Japanese Application No. 2011-125181, mailed Jun. 11, 2013, 3 pages.

Extended European Search Report received in Application No. 12192630.7-1853 mailed Jun. 17, 2013, 6 pages.

Matsushita Electric Industrial Co., Ltd. et al., "SD Memory Card Specification," Part 3 Security Specification, Version 1.0, Feb. 2000, 25 pages.

Matsushita Electric Industrial Co., Ltd. et al., "SD Memory Card Specifications," Part 1 Physical Layer Specification, Version 1.01, Apr. 15, 2001, 32 pages.

Extended European Search Report received in Application No. 11771488.1-1853 mailed Jun. 10, 2013, 12 pages.

United States Office Action received in U.S. Appl. No. 13/658,677 mailed May 22, 2014, 15 pages.

* cited by examiner

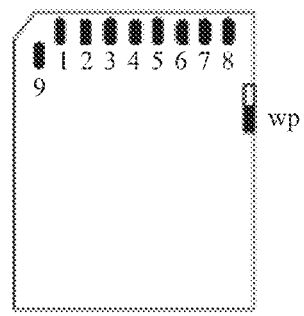

FIG. 1A

| Pin # | SD Mode | | | SPI Mode | | |
|---|---|---|---|---|---|---|
| | Name | Type | Description | Name | Type | Description |
| 1 | CD/DAT3 | I/O/PP | Card Detect/Data Line [Bit 3] | CS | I | Chip Select (neg true) |
| 2 | CMD | PP | Command/Response | DI | I | Data In |
| 3 | $V_{SS1}$ | S | Supply voltage ground | VSS | S | Supply voltage ground |
| 4 | $V_{DD}$ | S | Supply voltage | VDD | S | Supply voltage |
| 5 | CLK | I | Clock | SCLK | I | Clock |
| 6 | $V_{SS2}$ | S | Supply voltage ground | VSS2 | S | Supply voltage ground |
| 7 | DAT0 | I/O/PP | Data Line [Bit 0] | DO | O/PP | Data Out |
| 8 | DAT1 | I/O/PP | Data Line [Bit 1] | RSV | | |
| 9 | DAT2 | I/O/PP | Data Line [Bit 2] | RSV | | |

FIG. 1B

WIRELESS INTERNET ACCESS MODULE, COMMUNICATION METHOD FOR HOST AND WIRELESS INTERNET ACCESS MODULE, AND DATA CARD

CROSS-REFERENCE TO RELATED APPLICATIONS

This application is a continuation of U.S. patent application Ser. No. 13/658,677, filed on Oct. 23, 2012, which is a continuation of International Application No. PCT/CN2011/000714, filed on Apr. 25, 2011, which claims priority to Chinese Patent Application No. 201010154212.7, filed on Apr. 23, 2010, Chinese Patent Application No. 201010193917.X, filed on Jun. 3, 2010, Chinese Patent Application No. 201010193929.2, filed on Jun. 3, 2010, Chinese Patent Application No. 201010193948.5, filed on Jun. 3, 2010, and Chinese Patent Application No. 201010193967.8, filed on Jun. 3, 2010, all of which are hereby incorporated by reference in their entireties.

TECHNICAL FIELD

The present invention relates to the field of communications, and in particular, to a wireless Internet access module, a communication method for a host and a wireless Internet access module, and a data card.

BACKGROUND

With the development of wireless data services, a wireless Internet access module is more and more accepted because of its commercial characteristics such as considerable uplink and downlink rates, simplicity, and convenience. The wireless Internet access module is generally connected to a computer by use of an independent interface, such as, a USB (Universal Serial Bus, universal serial bus) interface, a PCI-E (Peripheral Component Interconnect express, peripheral component interconnect express) interface, a Mini PCI-E (mini PCI-E) interface or a PCMIA (Personal Computer Manufacturer Interface Adaptor, personal computer manufacturer interface adaptor) interface. The combination of the wireless Internet access module and the computer can form a user terminal. However, as user terminal products keep developing to be ultrathin and ultra miniature, while the existing wireless Internet access module has a large volume and therefore cannot be built into a miniature and ultrathin user terminal.

SUMMARY OF THE INVENTION

Embodiments of the present invention disclose a wireless Internet access module, a communication method for a wireless Internet access module and a host, and a data card.

The communication method for a wireless Internet access module and a host includes simulating each port on a wireless Internet access processing function unit in a wireless Internet access module into a secure digital card partition and reporting the secure digital card partition to a host side. Downlink interaction information is received from the host side. The received downlink interaction information is encapsulated in a secure digital card interface format. The encapsulated downlink interaction is decapsulated and the decapsulated downlink interaction information is delivered to a corresponding port. Uplink interaction information reported to the host side is received from each port. The received uplink interaction information is encapsulated in the secure digital card interface format and sent to the host side.

The wireless Internet access module includes a secure digital card interface function unit, a wireless Internet access processing function unit and an adaptation unit. The secure digital card interface function unit is configured to receive downlink interaction information from the host side or send uplink interaction information to the host side after it is detected that an electrical connection is established with a host side. The wireless Internet access processing function unit is configured to process the downlink interaction information from the host side, so as to implement wireless Internet access. The adaptation unit is configured to decapsulate the downlink interaction information encapsulated in a secure digital card interface format from the host side and received by the secure digital card interface function unit, to deliver the decapsulated downlink interaction information to a corresponding port of the wireless Internet access processing function unit, to receive the uplink interaction information reported to the host side from the port, to encapsulate the received uplink interaction information in the secure digital card interface format, and to send the encapsulated uplink interaction information to the host side through the secure digital card interface function unit.

The data card has a form of an encapsulating shape of a standard secure digital card or a micro secure digital card or a mini secure digital card, includes a 9-pin secure digital card interface, and further includes the foregoing wireless Internet access module.

Through the application of the wireless Internet access module, the communication method for a wireless Internet access module and a host, and the data card disclosed by the embodiments of the present invention, the wireless Internet access module of the secure digital card interface or the data card may communicate with the host side, so as to accomplish the wireless Internet access function.

An embodiment of the present invention discloses a communication method for a host and a wireless Internet access module, and a host communication module.

The communication method for a host and a wireless Internet access module includes receiving secure digital card partition information reported by a wireless Internet access module from a secure digital card interface. A serial port driver and a modem driver corresponding to the wireless Internet access module are loaded so as to provide a virtual serial port device and modem device for an application layer. Communication between the application layer and the virtual serial port device and modem device is mapped to a corresponding secure digital card partition of the wireless Internet access module of the secure digital card interface.

Another communication method for a host and a wireless Internet access module includes detecting whether the device that accesses the secure digital card interface is a wireless Internet access module of the secure digital card interface after it is detected that a device accesses a secure digital card interface. If so, secure digital card partition information reported from the wireless Internet access module of the secure digital card interface is received and a hardware identity ID of the wireless Internet access module of the secure digital card interface is modified. A serial port device and a modem device created according to the secure digital card partition information and a corresponding serial port driver and modem driver are loaded so as to enable an application layer to establish communication with a corresponding secure digital card partition of the wireless Internet access module of the secure digital card interface through the serial port device and the modem device.

A host communication module includes a secure digital card interface unit and a disk driver unit, and further includes a virtual bus driver unit, a serial port driver unit and a modem driver unit. The secure digital card interface unit is configured to establish a connection with a wireless Internet access module of a secure digital card interface. The disk driver unit is configured to establish a communication connection between the secure digital card interface unit and the virtual bus unit. The virtual bus unit is configured to receive secure digital card partition information reported from the wireless Internet access module of the secure digital card interface, and enable the serial port driver unit and the modem driver unit. The serial port driver unit and the modem driver unit are configured to provide a virtual serial port device and modem device for an application layer. The virtual bus unit is further configured to map communication between the application layer and the virtual serial port device and modem device to a corresponding secure digital card partition of the wireless Internet access module of the secure digital card interface.

Another host communication module includes a secure digital card interface unit, and a universal serial bus USB driver unit, and further includes a filter driver unit and a bus driver unit. The secure digital card interface unit is configured to detect access of a device to a secure digital card interface and establish a connection with the device. The USB driver unit is configured to establish a communication connection between the secure digital card interface unit and the filter driver unit. The filter driver unit is configured to detect whether the device that accesses the secure digital card interface is a wireless Internet access module of the secure digital card interface and, if so, to receive secure digital card partition information reported from the wireless Internet access module of the secure digital card interface and to modify a hardware identity ID of the wireless Internet access module of the secure digital card interface, so as to enable the bus driver unit. The bus driver unit is configured to create a serial port device and a modem device according to the secure digital card partition information and to load a corresponding serial port driver and modem driver, so as to enable an application layer to establish communication with a corresponding secure digital card partition of the wireless Internet access module of the secure digital card interface through the serial port device and the modem device.

Through the application of the communication method for a host and a wireless Internet access module, and the host communication module disclosed by the embodiment of the present invention, the host may communicate with the wireless Internet access module of the secure digital card interface or the data card, so as to accomplish the wireless Internet access function.

An embodiment of the present invention discloses a wireless Internet access method and system for a host device.

The method includes simulating, by a wireless Internet access module, a device management port and a modem port on a wireless Internet access processing function unit on the wireless Internet access module into a secure digital card partition and reporting the secure digital card partition to a host side. The host side receives information of the secure digital card partition reported by the wireless Internet access module and loads a serial port driver and a modem driver corresponding to the wireless Internet access module. A command or data delivered his encapsulated by an application layer to the device management port or modem port into a secure digital card interface format. The encapsulated command or data is mapped to a corresponding secure digital card partition of the wireless Internet access module. The wireless Internet access module receives the command or data encapsulated in the secure digital card interface format from the host side and decapsulates the encapsulated command or data. The decapsulated command or data is transferred to the corresponding device management port or modem port, so as to manage the wireless Internet access module through the device management port, or implement dial-up Internet access through the modem port.

The system includes a host device and a data card, in which the data card is provided with an antenna, a radio frequency unit, and a baseband processor, and the data card communicates with the host device by use of a secure digital interface, and includes a wireless Internet access module. The wireless Internet access module is configured to simulate a device management port and a modem port on a wireless Internet access processing function unit on the wireless Internet access module into a secure digital card partition and report the secure digital card partition to the host device. The host device is configured to receive information of the secure digital card partition reported by the wireless Internet access module, to load a serial port driver and a modem driver corresponding to the wireless Internet access module, to encapsulate a command or data delivered by an application layer to the device management port or modem port into a secure digital card interface format and to map the encapsulated command or data to a corresponding secure digital card partition of the wireless Internet access module.

The wireless Internet access module is further configured to receive the command or data encapsulated in the secure digital card interface format from the host device, to decapsulate the encapsulated command or data, and to transfer the decapsulated command or data to the corresponding device management port or modem port, so as to manage the wireless Internet access module through the device management port, or implement dial-up Internet access through the modem port.

Through the application of the wireless Internet access method and system for a host device disclosed by the embodiment of the present invention, the host device may accomplish the wireless Internet access function with the wireless Internet access module of the secure digital card interface or the data card.

An embodiment of the present invention discloses a wireless Internet access module, a method for synchronizing data by use of a wireless Internet access module, and a data card.

The method includes detecting that the wireless Internet access module of a secure digital interface is enabled. Dialing is performed according to preset dialing information and a corresponding network space is signed into according to preset network space information. Data in the network space and a secure digital storage function unit of the wireless Internet access module are synchronously updated according to a preset synchronization policy. The preset dialing information, the preset network space information and the preset synchronization policy are obtained through a secure digital card interface of the wireless Internet access module.

The wireless Internet access module includes a secure digital card interface function unit, a wireless Internet access processing function unit, and a secure digital storage function unit, and further includes a data synchronization function unit. The secure digital card interface function unit is configured to connect a first host provided with a secure digital card interface. The wireless Internet access processing function unit is configured to perform dialing according to preset dialing information and to sign in a corresponding network space according to preset network space information. The preset dialing information and the preset network space information are obtained through the secure digital card interface function unit. The data synchronization function unit is configured to synchronously update data in the network space and the secure digital storage function unit of the wireless Internet access module according to a preset synchronization policy and the preset synchronization policy is obtained through the secure digital card interface function unit.

The data card has a form of an encapsulating shape of a standard secure digital card or a micro secure digital card or a mini secure digital card, includes a 9-pin secure digital card interface, and further includes the foregoing wireless Internet access module.

Through the application of the wireless Internet access module, the method for synchronizing data by use of a wireless Internet access module, and the data card disclosed by the embodiment of the present invention, information in the secure digital storage space in the wireless Internet access module and information in a specified space at an external network may be synchronized through wireless Internet access.

BRIEF DESCRIPTION OF THE DRAWINGS

The accompanying drawings are included to provide further understanding of the present invention and constitute a part of this specification, but not intended to limit the present invention. In the accompanying drawings:

FIG. 1A is a schematic diagram of the form of an existing SD card and a 9-pin interface;

FIG. 1B is a schematic diagram of names, types and processed signals of nine pins of an SD card interface;

DETAILED DESCRIPTION OF ILLUSTRATIVE EMBODIMENTS

Figure 2:
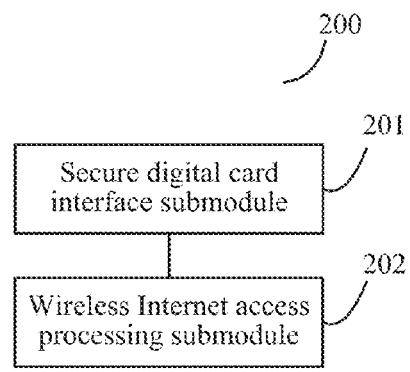
FIG. 2 is a schematic structural diagram of a wireless Internet access module disclosed by an embodiment of the present invention.

In order to make the objectives, technical solutions, and advantages of the present invention more comprehensible, the present invention is further described in detail in the following through the embodiments with reference to the accompanying drawings. Herein, the exemplary embodiments of the present invention and descriptions thereof are only intended to explain the present invention, instead of limiting the present invention.

A Secure Digital Memory Card (secure digital card), SD card in short, (the name of SD card is adopted in the application document of the present invention in the following), has a standard size of 32 mm×24 mm×2.1 mm. The SD card in combination with the flash memory card control and MLC (Multilevel Cell, multilevel cell) technology of SanDisk (SanDisk) corporation and the 0.16 u and 0.13 u NAND (Not AND, Not AND) technology of Toshiba (Toshiba) corporation, is connected to a dedicated driver through a 9-pin interface. Two wiring manners may be provided for the 9-pin interface, which are a secure digital input/output (Secure Digital Input and Output, SDIO in short) manner and a serial peripheral interface (Serial Peripheral Interface, SPI in short) manner, respectively. FIG. 1A is a schematic diagram of the form of an SD card and a 9-pin interface. Names, types and processed signals of the nine pins (pin) are shown in FIG. 1B. In an SDIO mode, the pin No. 1 is configured to transmit a card detection signal, and forms a four-bit data signal together with the pin No. 9, the pin No. 8, and the pin No. 7, the pin No. 2 is configured to transmit a command and a response, the pin No. 3 and the pin No. 6 are ground pins, the pin No. 4 is connected to a power supply, and the pin No. 5 is connected to a clock signal. In an SPI mode, the pin No. 1 is configured to select a chip, the pin No. 2 and the pin No. 7 are configured to input and output data, respectively, the pin No. 3 and the pin No. 6 are ground pins, the pin No. 4 is connected to a power supply, and the pin No. 5 is connected to a clock signal. A WP (Write Protect, write protect) terminal shown in FIG. 1A may have a physical switch structure, which is configured to set or unset the write protect function of the SD card, the specific structure and working principle of which are well known, and are not repeated herein. The SD card is very widely applied to terminal devices such as a digital camera, a mobile phone and an MID (Mobile Internet Device, mobile Internet device) due to its structural characteristics of being lightweight and compact. In addition to the standard SD card, a micro secure digital card (Micro Secure Digital Memory Card, MicroSD in short, which may be also referred to as a Trans Flash card or TF card) in a size of 15 mm×11 mm×1 mm and a Mini SD card (mini SD card) in a size of 21.5 mm×20 mm×1.4 mm are also widely applied. Furthermore, through the connection of an adaptor, a MicroSD card or Mini SD card may also be inserted into a standard SD card slot of a terminal device for use.

The technical solution provided by the embodiment of the present invention is to integrate a wireless Internet access module in a standard SD card, or integrate it in a MicroSD card or Mini SD card. In such a standard SD card or MicroSD card or Mini SD card, a wireless Internet access module adopting a secure digital interface is introduced, which may be used as a product form of a data card. Through the connection of the adaptor, the MicroSD card or Mini SD card may also be inserted into the SD card slot of the terminal device for use, and the technical solution of the embodiment of the present invention is illustrated in the following by taking the standard SD card as an example. The solution for integrating the wireless Internet access module in the MicroSD card or Mini SD card may be implemented with reference to the manner for the standard SD. For convenience of illustration, when not specified or distinguished, the SD card in the following refers to an SD card of a standard size.

FIG. 2 shows a wireless Internet access module 200 provided by an embodiment of the present invention, and the module includes: a secure digital card interface submodule 201, a wireless Internet access processing submodule 202. The wireless Internet access processing submodule 202 exchanges information with a user terminal through the secure digital card interface submodule 201.

The wireless Internet access module 200 is inserted into the user terminal through a secure digital card slot or micro secure digital card slot, and a wireless connection may be established. A user may perform wireless Internet access with the user terminal.

The wireless Internet access module 200 may have a shape of the SD card shown in FIG. 1A, in which the secure digital card interface submodule 201 has nine pins shown in FIG. 1A in terms of the external shape. The wiring manner of the wireless Internet access module 200 may be the SDIO manner or the SPI manner. The specific pin signals are already introduced in FIG. 1B. Moreover, in these two manners, the wiring manner and the driver manner of each pin in an SD card are also mature in the prior art, which are well known to persons of ordinary skill in the art, and are not repeated again herein.

Figure 3:
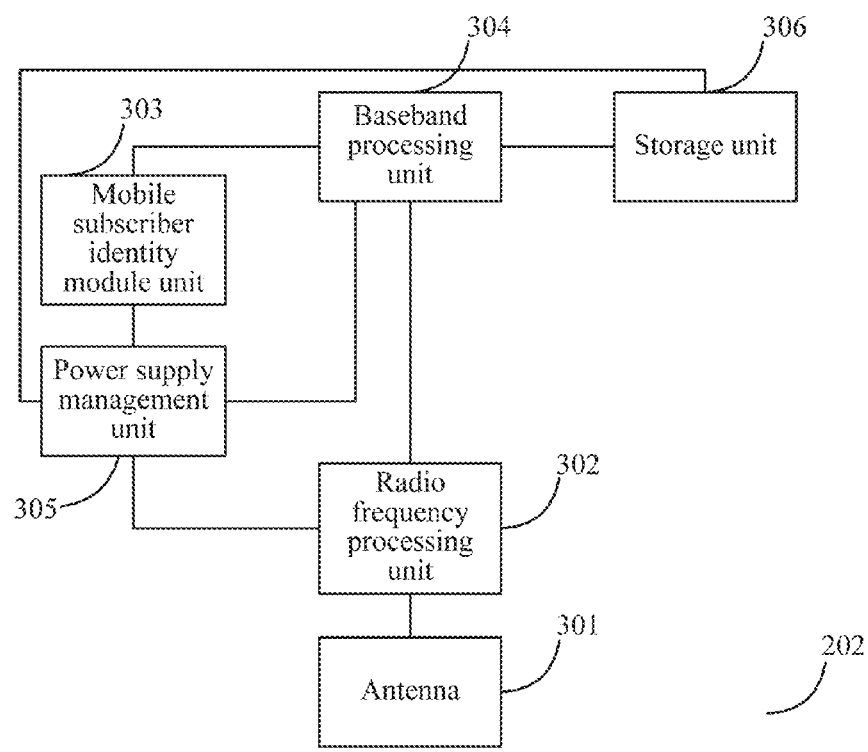
FIG. 3 is a schematic structural diagram of a wireless Internet access processing submodule in a wireless Internet access module disclosed by an embodiment of the present invention.

An implementation manner of the wireless Internet access processing submodule 202 may be as shown in FIG. 3, which includes an antenna 301, a radio frequency processing unit 302, an SIM (Subscriber Identity Module, mobile subscriber identity module) unit 303 and a baseband processing unit 304.

The antenna 301 is configured to transmit a received wireless signal to the radio frequency processing unit 202, or convert a transmit signal of the radio frequency processing unit 302 into an electromagnetic wave, and send the electromagnetic wave out.

Figure 4:
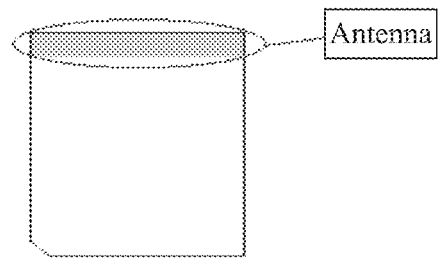
FIG. 4 is a schematic diagram of an antenna layout of a wireless Internet access module disclosed by an embodiment of the present invention.

It should be noted that, the antenna 301 may be set in a motherboard of the wireless Internet access module, for example, the antenna 301 may be laid on the motherboard of the wireless Internet access module, as shown in FIG. 4. The antenna 301 is located at the other end of the wireless Internet access module, that is, the antenna 301 and the secure digital card interface are located at two ends of the wireless Internet access module, respectively. Alternatively, the antenna may be further connected to the radio frequency processing unit through a motherboard contact of the wireless Internet access module.

It should be further noted that, at the place where the antenna is laid, a certain area where component arrangement is forbidden may be reserved.

The radio frequency processing unit 302 is configured to perform frequency selection, amplification, down conversion processing on a wireless signal received by the antenna 301, convert the wireless signal into an intermediate frequency signal or baseband signal and send the intermediate frequency signal or baseband signal to the baseband processing unit 304; or, configured to perform up conversion and appropriate amplification on the baseband signal or intermediate frequency signal sent by the baseband processing unit 304 and send the baseband signal or intermediate frequency signal out through the antenna 301.

The mobile subscriber identity module unit 303 is configured to store user parameter information, in which the user parameter information may include: content such as information of a digital mobile phone client, and a key for encryption, which may be provided for a network to identify the client identity, and encrypt voice information during a call of a client.

It should be noted that, the mobile subscriber identity module unit may be formed by encapsulating an SIM die (die) through an encapsulating technology.

The baseband processing unit 304 is configured to process the received intermediate frequency signal or baseband signal according to the parameter information obtained by the mobile subscriber identity module unit 303 and wireless standard protocol requirements; or, receive data information from the secure digital card interface submodule 201; perform data recognition on the data information; if the data information includes a transmission control command, send the transmission control command through a transmission control command port; and if the data information includes a transmission network message, send the transmission network message through a transmission network message port.

It should be noted that, the wireless Internet access processing submodule 202 may further include: a power supply management unit 305 and a storage unit 306.

The power supply management unit 305 is configured to convert the power supply voltage of the user terminal into the voltage required by the baseband processing unit 304, the storage unit 306, the radio frequency processing unit 302, and the mobile subscriber identity module unit 303, so as to provide a power supply for each unit.

The storage unit 306 is configured to store the transmission network message obtained with the processing of the baseband processing unit 304 and an application required for the running of the wireless Internet access module.

It can be seen from the above description that, after the wireless Internet access module 200 is integrated on an SD card, interaction between the wireless Internet access module 200 and a PC can only be accomplished through an interface of the SD card, that is, to be accomplished in the SDIO or SPI manner. However, in the prior art, an SD card slot on the PC can only recognize a particular command, so the information exchange between the wireless Internet access module 200 and the PC cannot be accomplished.

Figure 5:
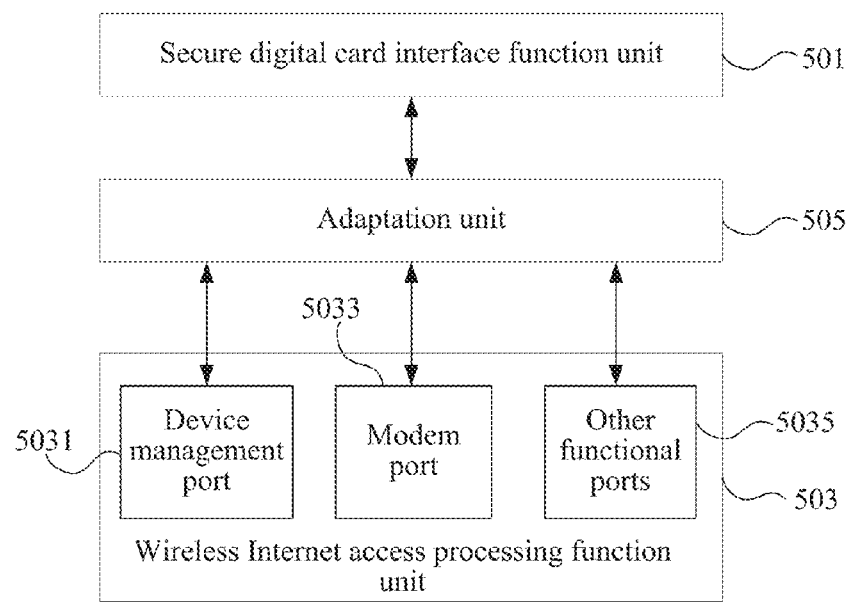
FIG. 5 is a schematic functional structural diagram of a wireless Internet access module disclosed by an embodiment of the present invention.

In order to solve this technical problem, an embodiment of the present invention further proposes the following technical solution. Referring to FIG. 5, FIG. 5 is a schematic functional structural diagram of the wireless Internet access module 200.

A secure digital card interface function unit 501 is a software function unit on the secure digital card interface submodule 201, and is configured to communicate with a host side in the existing SDIO or SPI manner through a 9-pin interface of the existing SD card. This functional unit already exists in the existing SD card. The wireless Internet access processing function unit 503 is a software function unit on the wireless Internet access processing submodule 202, and may implement the wireless Internet access function in the existing manner. Specifically, the wireless Internet access processing function unit 503 may include several ports, which for example, as shown in FIG. 5, may be a device management port 5031, a Modem (modem) port 5033 and other functional ports 5035, respectively. The device management port 5031 is configured to manage the wireless Internet access processing submodule 202 according to the device management command and/or data from the host side; the Modem port 5033 is configured to implement wireless Internet access functions such as dial-up Internet access and data message transmission according to the modem command and/or data from the host side; the other functional ports 5035 are configured to implement other functions, such as, a network card function and a GPS function according to other commands and data from the host side, which are not limited in the embodiment of the present invention. As described above, in the embodiment of the present invention, the secure digital card interface function unit 501 and the wireless Internet access processing function unit 503 may both be implemented by use of the solution in the prior art. Definitely, the embodiment of the present invention does not exclude the separate improvement of these two functional units, so as to improve the respective function or efficiency.

When the secure digital card interface function unit 501 and the wireless Internet access processing function unit 503 are implemented by use of the solution in the prior art, or when, although one or both of these two functional units are improved, the communication interface between the one or both of these two functional units and other functional units is not changed, the aforementioned solution of the embodiment of the present invention is adopted, the wireless Internet access processing submodule 202 is integrated in the wireless Internet access module 200 of the SD card interface, and when the wireless Internet access processing submodule 202 interacts with the host side through the secure digital card interface submodule 201, because the communication interface of the wireless Internet access processing submodule 202 and the communication interface of the secure digital card interface submodule 201 are different, it is required to insert an adaptation unit 505 between the two functional modules, so as to provide translation, that is, build a bridge, for the communication and interaction between the wireless Internet access processing submodule 202 and the secure digital card interface submodule 201.

The adaptation unit 505 is a software unit or a hardware unit. However, the embodiment of the present invention is exemplarily implemented in a software manner. If the adaptation unit 505 is a software unit, the adaptation unit 505 may be installed in a storage unit 306 of the wireless Internet access processing submodule 202, or may also be installed in a storage unit configured to store a driver program in the secure data card interface submodule 201, or a storage space is separately taken from the wireless Internet access module 200 for installing the software of the adaptation unit 505. The adaptation unit 505 is configured to: simulate each port on the wireless Internet access processing function unit 503 into an SD card partition, and report the SD card partition to the host side through the secure digital interface function unit 501; receive downlink interaction information encapsulated in an SD card interface format from the host side through the secure digital interface function unit 501, decapsulate the downlink interaction information encapsulated in the SD card interface format, and deliver the corresponding downlink interaction information to each port according to an interface format of the wireless Internet access processing function unit; and encapsulate, according to the SD card interface format, the uplink interaction information reported by each port to the host side in the interface format of the wireless Internet access processing function unit, and send the encapsulated uplink interaction information to the host side through the secure digital interface function unit 501. The downlink interaction information may be a command or data delivered by the host side to each port of the wireless Internet access processing submodule 202, or data or a response reported by each port of the wireless Internet access processing submodule 202 to the host side. It can be understood that, for the implementation, the adaptation unit 505 may include a secure digital card partition information generation subunit, configured to obtain configuration information of each port of the wireless Internet access processing function unit, and generate secure digital card partition information corresponding to each port, respectively, according to the configuration information; and a secure digital card partition information report subunit, configured to interact with the host side according to an initialization process of the secure digital card, and report the secure digital card partition information to the host side; and a secure digital card partition mapping subunit, configured to map the generated partitions to corresponding ports of the wireless Internet access processing function unit, respectively. Further, the adaptation unit 505 may further include: a decapsulation subunit, configured to parse a data packet of a small computer system interface SCSI write request command or a data packet of an SCSI read request command from the host side received by the secure digital card interface function unit; a write port subunit, configured to write a command or data in the data packet of the SCSI read request command parsed by the decapsulation subunit into a corresponding port of the wireless Internet access processing function unit; a read port subunit, configured to read the data packet from the corresponding port of the wireless Internet access processing function unit according to a read command in the data packet of the SCSI read request command parsed by the decapsulation subunit; and an encapsulation subunit, configured to encapsulate the data packet read by the read port subunit from the corresponding port of the wireless Internet access processing function unit into a response data packet of the SCSI read request command, and report the response data packet to the host side through the secure digital card interface function unit.

Figure 6:
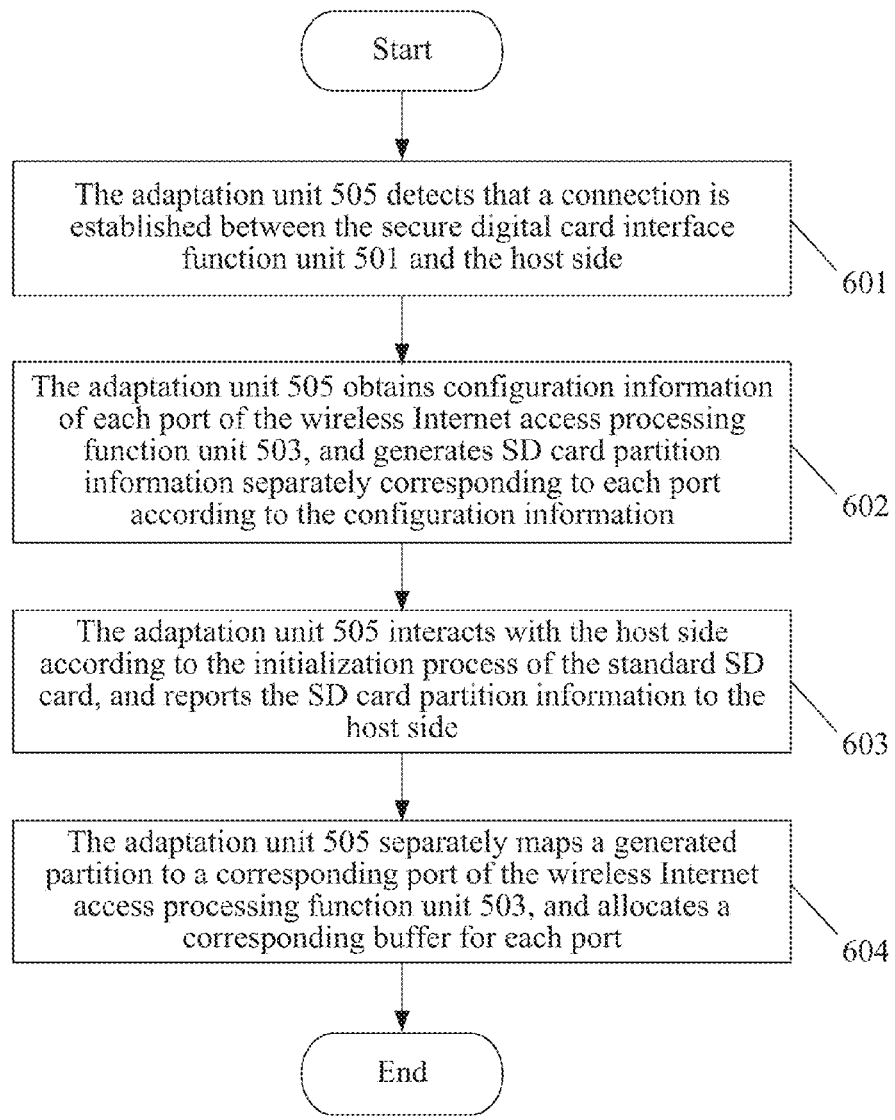
FIG. 6 is a flow chart of a method in which a wireless Internet access module reports port information to a host side disclosed by an embodiment of the present invention.

For an example of the specific process in which the adaptation unit 505 simulates each port on the wireless Internet access processing function unit 502 into an SD card partition, and reports the SD card partition to the host side through the secure digital interface function unit 501, reference may be made to FIG. 6.

Step 601: The adaptation unit 505 detects that a connection is established between the secure digital card interface function unit 501 and the host side. The shown adaptation unit 505 may judge that a connection is established between the secure digital card interface function unit 501 and the host side upon detecting that an electrical connection is established between the wireless Internet access module 200 where the adaptation unit 505 is located and the host side. In practical use, the wireless Internet access module 200 of the SD card interface is inserted into the SD slot or card reader of the host side, so an electrical connection may be established with the host side through the fourth pin in the 9-pin interface. In this case, the adaptation unit 505 may detect that the wireless Internet access module 200 is already powered on, and may judge that a connection is established between the secure digital card interface function unit 501 and the host side.

Step 602: The adaptation unit 505 obtains configuration information of each port of the wireless Internet access processing function unit 503, and generates SD card partition information separately corresponding to each port according to the configuration information. The configuration information may, for example, include the port quantity, the port type and the port arrangement sequence. The SD card partition information is information of the partition specification of the SD card itself.

Step 603: The adaptation unit 505 interacts with the host side according to the initialization process of the standard SD card, and reports the SD card partition information to the host side.

Step 604: The adaptation unit 505 separately maps a generated partition to a corresponding port of the wireless Internet access processing function unit 503, and allocates a corresponding buffer for each port. The buffer is configured to store uplink interaction information and/or downlink interaction information between the host side and each port, and should be at least configured to store the uplink interaction information. It can be understood that, the buffer may be on the wireless Internet access module, and in this case, the wireless Internet access module further includes a storage unit.

As described above, the adaptation unit 505 on the wireless Internet access module 200 of the SD card interface reports a partition of the SD card to the host side, and each partition actually is each port of the wireless Internet access processing function unit 503 on the wireless Internet access module 200, such as, a device management port 5031, and a Modem port 5033. In contrast, the host side is required to recognize that only when the wireless Internet access module 200 of the SD card interface is a wireless Internet access device can the application layer software of the host side use the wireless Internet access function of the wireless Internet access module 200. The host being a PC is taken as an example in the following to illustrate a method in which a PC recognizes that the device inserted into the SD card slot or card reader is a wireless Internet access device.

Figure 7:
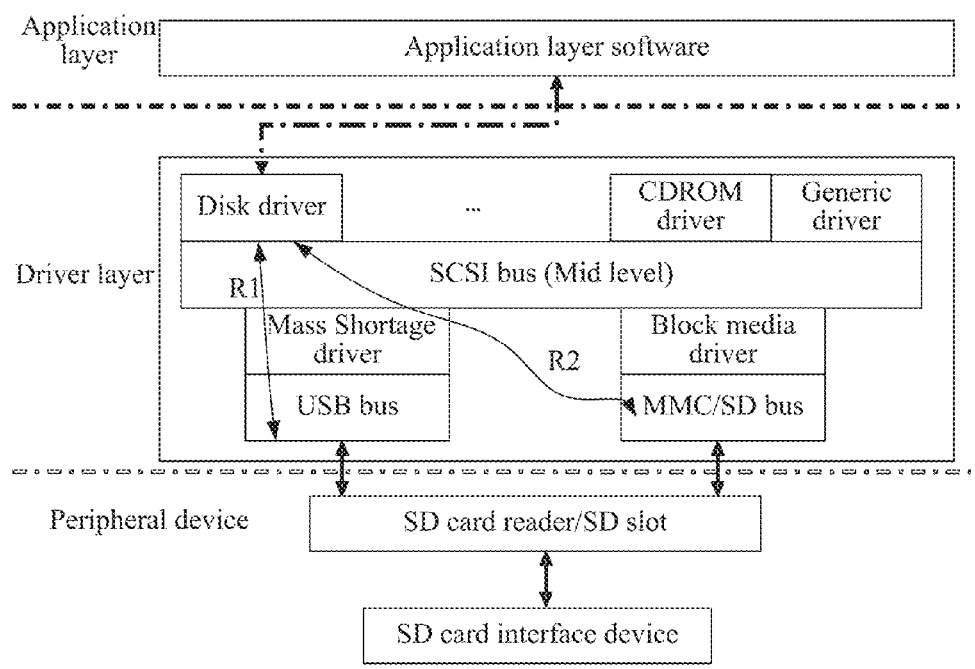
FIG. 7 is a schematic structural diagram of a driver at a PC side for a universal SD card interface device in the prior art.

In the prior art, a schematic structural diagram of a driver at a PC side for a universal SD card interface device is shown in FIG. 7. In FIG. 7, the SD card interface device is inserted into an SD card reader or SD slot. According to different driver manners of the host for the SD card reader or SD slot, two data paths may be provided, which are R1 and R2, respectively.

For R1, the SD card reader or SD slot is directly connected to a USB (Universal Serial BUS, universal serial bus) bus. Data passes through a USB bus, a Mass Storage (mass storage) driver, a mid level (Mid level) of an SCSI (small computer system interface, Small Computer System Interface) bus, and a Disk (disk) driver for information exchange with the application layer software.

For R2, the SD card reader or SD slot is directly connected to an MMC (Multi Media Card, multi media card)/SD bus. Data passes through an MMC/SD bus, a block media driver, a mid level of an SCSI bus, and a Disk driver for information exchange with the application layer software.

No matter whether the path R1 or the path R2 is adopted, in the prior art, the host side can only recognize and use the SD card interface device as a storage device. For the wireless Internet access module 200 inserted into the SD card reader or the SD card interface of the SD slot, the adoption of the PC driver structure in the prior art cannot implement the wireless Internet access function. Therefore, an embodiment of the present invention discloses a driver structure at a PC side, referring to FIG. 8.

Figure 8:
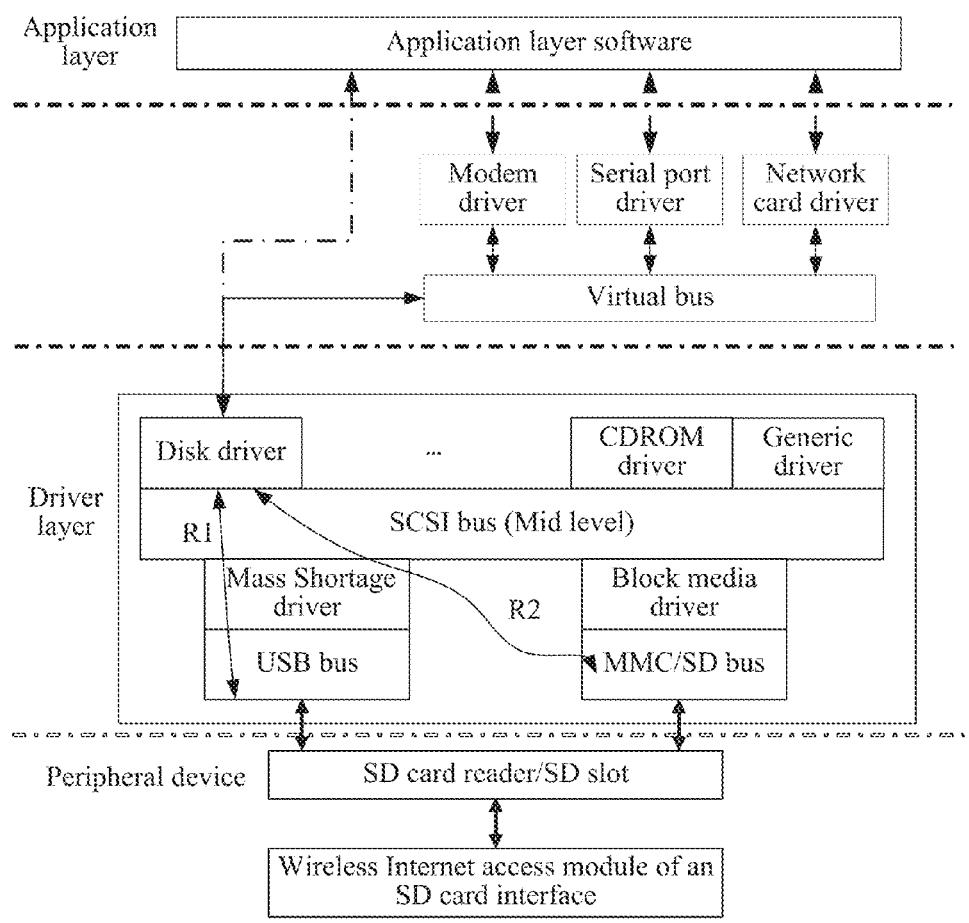
FIG. 8 is a schematic structural diagram of a driver at a PC side for an SD card interface device disclosed by an embodiment of the present invention.

It can be known through comparison with FIG. 7 that, in the embodiment shown in FIG. 8, a virtual bus, a Modem driver, and a serial port driver are added to a driver layer of a host. Optionally, when the wireless Internet access module 200 of the SD card interface may further support a local area network connection, a network card driver may be further added, and in this case, the other functional ports 5035 on the wireless Internet access module 200 should include a network card function port, and definitely, other functional ports may further exist. The Modem driver, the serial port driver and the network card driver may all be private drivers of the wireless Internet access module 200 of the SD card interface, that is, drivers specially developed for the wireless Internet access module 200 of the SD card interface, or standard drivers carried by a PC operating system itself. Generally speaking, for example, a Windows operating system may be equipped with some universal peripheral drivers, and if these drivers may recognize each port on the wireless Internet access module 200, these drivers may be used. Exemplarily, the embodiment of the present invention adopts a special private driver.

When the wireless Internet access module 200 of the SD card interface is connected to a PC, an adaptation layer 505 on the wireless Internet access module 200 of the SD card interface reports partition information of the SD card to the host side. After the wireless Internet access module 200 of the SD card interface is loaded with a Disk driver according to the case of the SD card interface device in the prior art, the virtual bus detects the wireless Internet access module 200 of the SD card interface, and a corresponding serial port driver and Modem driver are automatically loaded, so as to provide a virtual serial port device and Modem device for the application layer. Then, through the virtual bus, the serial port device and Modem device are mapped to corresponding SD card partitions of the wireless Internet access module 200 of the SD card interface. The mapping through the virtual bus refers to that the developer of the virtual bus and the developer of the wireless Internet access module 200 of the SD interface agree in advance on a rule of a corresponding relationship between a partition and various devices of the wireless Internet access module 200 of the SD card interface, for example, between each partition and the serial port device and Modem device, respectively. That is, the virtual bus knows which SD partition is a corresponding serial port device, and which SD partition is a corresponding Modem device. In this way, the application layer operates the virtual serial port device and Modem device, practically, that is, operates a corresponding partition of the wireless Internet access module 200 of the SD card interface. Also, each corresponding partition of the wireless Internet access module 200 of the SD card interface is actually each port of the wireless Internet access processing function unit 503 on the wireless Internet access module 200, such as, the device management port 5031, and the Modem port 5033, so the operating, by the application layer, the virtual serial port device and Modem device is operating the device management port 5031 and the Modem port 5033 of the wireless Internet access module 200 of the SD card interface. In other words, communication between the application layer and the serial port device and modem device is mapped to a corresponding SD card partition of the wireless Internet access module 200 of the SD card interface. The host side in this case may be regarded as being configured with a host communication module, and the host communication module includes a secure digital card interface unit and a disk driver unit, and further includes a virtual bus unit, a serial port driver unit and a modem driver unit, in which the secure digital card interface unit is configured to establish a connection with a wireless Internet access module of a secure digital card interface; the disk driver unit is configured to establish a communication connection between the secure digital card interface unit and the virtual bus unit; the virtual bus unit is configured to receive secure digital card partition information reported from the wireless Internet access module of the secure digital card interface, and enable the serial port driver unit and the modem driver unit; the serial port driver unit and the modem driver unit are configured to provide a virtual serial port device and modem device for an application layer; and the virtual bus unit is further configured to map communication between the application layer and the virtual serial port device and modem device to a corresponding secure digital card partition of the wireless Internet access module of the secure digital card interface. The virtual bus unit includes a mapping subunit, and the mapping subunit is configured to, according to a predetermined rule of a corresponding relationship between the virtual serial port device and modem device and the corresponding secure digital card partition of the wireless Internet access module of the secure digital card interface, map the communication between the application layer and the virtual serial port device and modem device to the corresponding secure digital card partition of the wireless Internet access module of the secure digital card interface.

Figure 9:
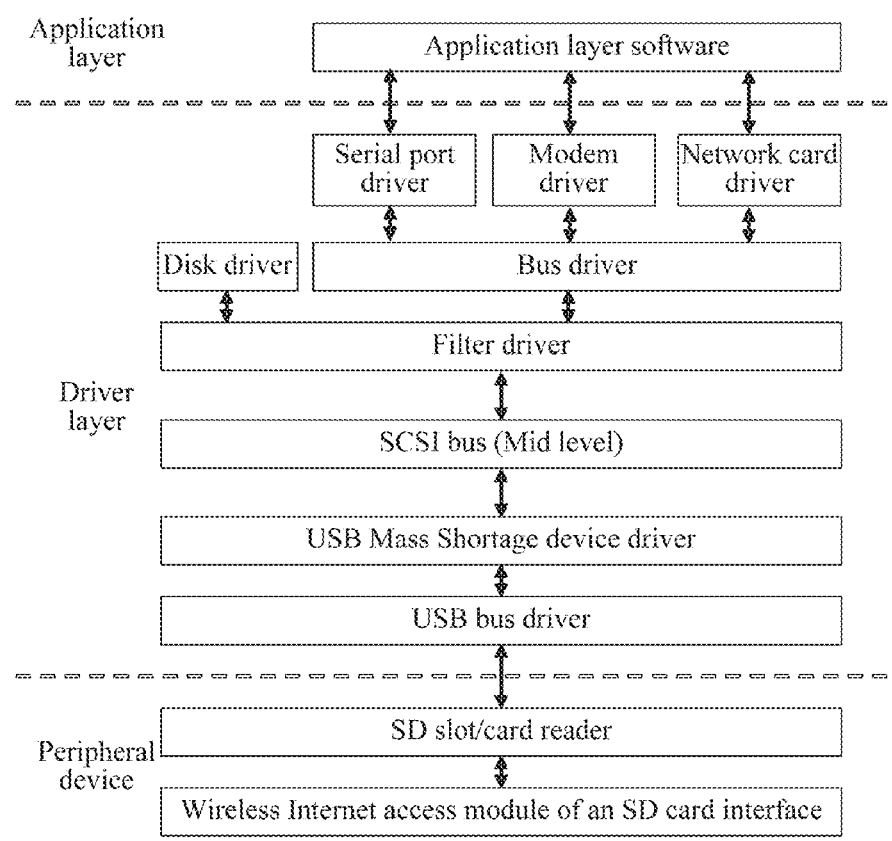
FIG. 9 is a schematic structural diagram of a driver at a PC side for another SD card interface device disclosed by an embodiment of the present invention.

For the path R1, an embodiment of the present invention further provides another driver structure at a PC side. Referring to FIG. 9, it can be known from FIG. 9 that, in the embodiment of the present invention, a Filter (filter) driver is added between an SCSI bus mid level and a Disk driver. Furthermore, a bus driver, a corresponding serial port driver and Modem driver, and optionally, a network card driver are added to the Filter driver in parallel to the Disk driver. The serial port driver, the Modem driver and the network card driver may be private drivers of the wireless Internet access module 200 of the SD card interface, or standard drivers, which are not repeated again herein. The host side in this case may be regarded as being configured with another host communication module, including a secure digital card interface unit, and a universal serial bus USB driver unit, and further includes a filter driver unit and a bus driver unit, in which the secure digital card interface unit is configured to detect access of a device to a secure digital card interface and establish a connection with the device; the USB driver unit is configured to establish a communication connection between the secure digital card interface unit and the filter driver unit; the filter driver unit is configured to detect whether the device that accesses the secure digital card interface is a wireless Internet access module of the secure digital card interface, and if yes, receive secure digital card partition information reported from the wireless Internet access module of the secure digital card interface, and modify a hardware identity ID of the wireless Internet access module of the secure digital card interface, so as to enable the bus driver unit; and the bus driver unit is configured to create a serial port device and a modem device according to the secure digital card partition information, and load a corresponding serial port driver and modem driver, so as to enable an application layer to establish communication with a corresponding secure digital card partition of the wireless Internet access module of the secure digital card interface through the serial port device and the modem device.

Figure 10:
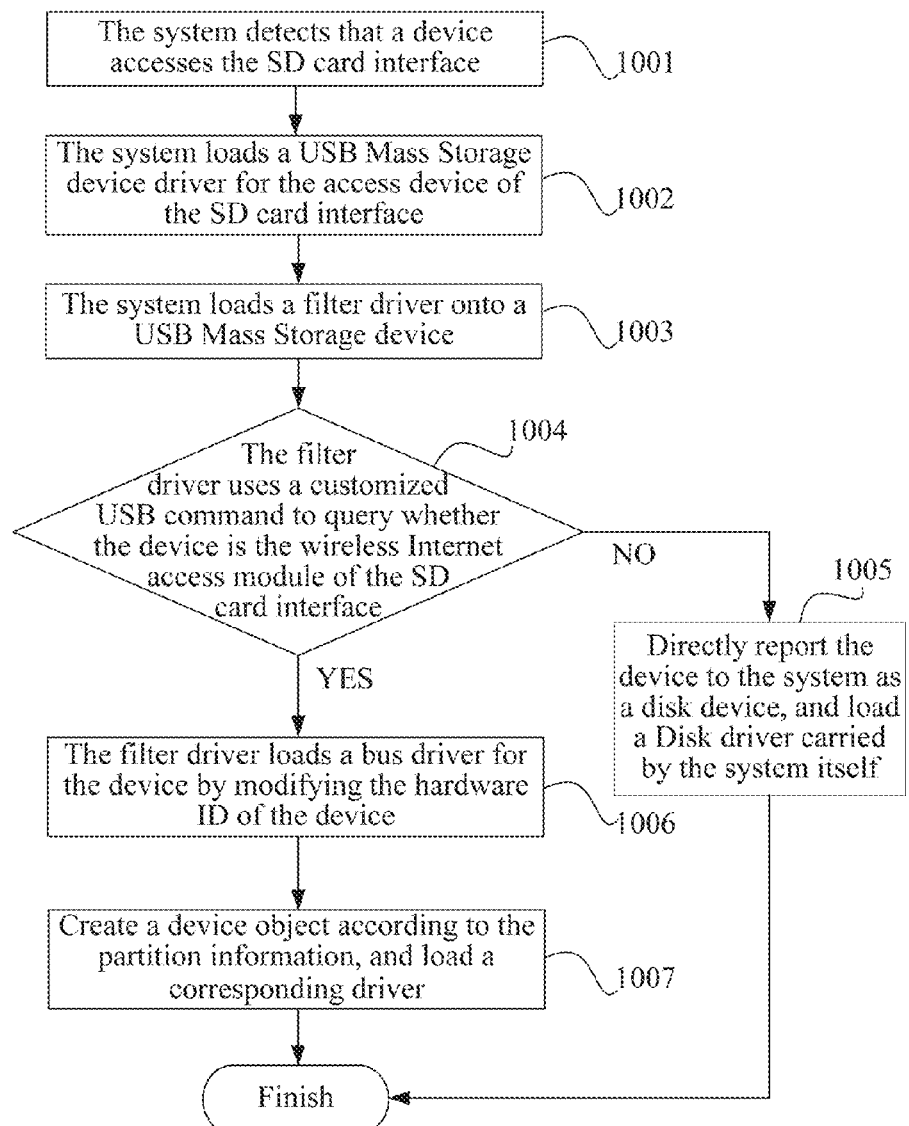
FIG. 10 is a flow chart in which a PC system loads a driver for a wireless Internet access module of an SD card interface disclosed by an embodiment of the present invention.

In the case that the driver structure at the PC side of FIG. 9 is adopted, when the wireless Internet access module 200 of the SD card interface is connected to a PC, an adaptation layer 505 on the wireless Internet access module 200 of the SD card interface reports a partition of the SD card to the host side. The procedure in which the PC system loads a driver for the wireless Internet access module 200 of the SD card interface may be shown in FIG. 10.

Step 1001: The system detects that a device accesses the SD card interface.

Step 1002: The system loads a USB Mass Storage driver for the device of the SD card interface.

Step 1003: The system loads a filter driver onto a USB Mass Storage.

Step 1004: The filter driver uses a customized USB command to query whether the device is the wireless Internet access module of the SD card interface. As an example, the format of this customized USB command may be as follows.

| Field | Size (byte) | Value |
| --- | --- | --- |
| bmRequestType | 1 | 0xc0 |
| bRequest | 1 | 0x9a |
| wValue | 2 | 0x01 |
| wIndex | 2 | 0x00 |
| wlength | 2 | 0x0F |

It can be seen from the foregoing description that, the USB command has a format of a standard USB command, in which it is customized as a command for querying whether the device is the wireless Internet access module of the SD card interface when the value of the field bRequest is 0x9a. This customized value is only used as an example instead of a limitation. Other customized characters may be used as the value of a field to execute this function. The query function may be implemented with a query submodule included in the filter driver unit.

A return value of the wireless Internet access module of the SD card interface for this command may be set to be a character or code of a certain particular format or content, such as, a character string "HW_SD_DATACARD" of the ASCII form; while for other devices, because this customized command is not supported, the return value cannot indicate that the devices are the wireless Internet access module of the SD card interface, for example, STALL may be directly returned.

Step 1005: For a device whose return value cannot indicate that the device is the wireless Internet access module of the SD card interface, such as, a device directly returning STALL, the filter driver judges that the access device is not the wireless Internet access module, directly reports the device to the system as a disk device, and loads a Disk driver carried by the system itself. The driver loading procedure is completed.

Step 1006: For a device whose return value indicates that the device is the wireless Internet access module of the SD card interface, the filter driver loads a bus driver for the device by modifying the hardware ID (Identity, identity) of the device. As an example, the hardware ID of the device may be modified into a form of "HW_SD/VID_12D1&PID_xxxx". It can be understood that, for different ports of the wireless Internet access module, different hardware IDs may be set. The developer of the filter driver and the developer of the wireless Internet access module 200 of the SD interface agree in advance on a rule of a corresponding relationship between a partition and various devices, such as, the serial port device and the Modem device, of the wireless Internet access module 200 of the SD card interface. That is, the filter driver knows which SD partition is a corresponding serial port device, and which SD partition is a corresponding Modem device. By modifying the hardware ID, the corresponding relationship no longer requires to be maintained on the bus driver. This function of modifying the hardware ID may be implemented with a hardware ID modification submodule included in the filter driver unit. It can be understood that, the filter driver unit further includes a storage device report submodule, configured to, if the device that accesses the secure digital card interface is not the wireless Internet access module of the secure digital card interface, report the device as an ordinary storage device of the secure digital card interface.

Step 1007: The bus driver creates a corresponding device according to the SD card partition information reported by the wireless Internet access module 200 of the SD card interface, and loads a corresponding driver. For example, the bus driver queries the number of partitions of the wireless Internet access device of the SD interface by use of a standard SCSI command, and creates different device objects according to expansion type information in the partitions, thereby loading different drivers of a Modem, a serial port, and a network card. The driver loading procedure is completed.

After the driver is loaded in any one of the foregoing manners, application software of the application layer, such as, management software of the wireless Internet access module, may communicate with the wireless Internet access module 200 of the SD interface. Taking the driver structure shown in FIG. 8 as an example, at the PC side, the communication method is shown in FIG. 11.

Figure 11A:
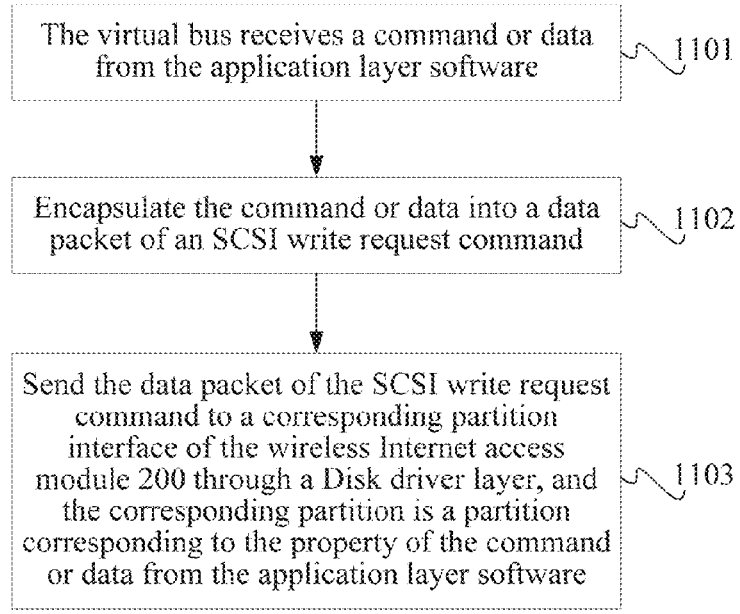
FIG. 11A is a flow chart of a method in which a PC side sends a command to or writes data into a wireless Internet access module provided by this embodiment.

FIG. 11A shows a method in which the PC side sends a command to or writes data into the wireless Internet access module 200. For example, the application layer software at the PC side sends a command to an SD card partition corresponding to a virtual serial port device of the wireless Internet access module 200 to manage the wireless Internet access module 200, or transfers data to an SD card partition corresponding to a virtual Modem device of the wireless Internet access module 200, thereby transferring the data to an external network through a wireless Internet access function of the wireless Internet access module 200.

Step 1101: The virtual bus receives a command or data from the application layer software. For example, the command may be the foregoing command which the application layer software uses for managing the wireless Internet access module 200, and the data may be the foregoing data which the application layer software is required to transfer to the external network with the wireless Internet access module 200. It can be understood that, according to different properties of the command or data, and different manners in which the current wireless Internet access module 200 accesses a network, the command or data may be delivered through a serial port, a Modem port or a network port.

Step 1102: Encapsulate the command or data into a data packet of an SCSI write request command. Specifically, as an example, a field used for indicating an operation type in the SCSI command which is assigned with a value corresponding to a write request, an address buffered by the command or data, or information used for indicating the address, and the write request command are encapsulated together as a data packet of the SCSI write request command.

Step 1103: The data packet of the SCSI write request command is sent to a corresponding partition interface of the wireless Internet access module 200 through a Disk driver layer, and the corresponding partition is a partition corresponding to the function or property of the command or data from the application layer software. According to the existing PC driver architecture, writing data to a partition of an SD card is accomplished by a Disk driver. The virtual bus is required to first send a data packet required to be written into each partition interface of the wireless Internet access module 200 to a Disk driver, and the data packet is written by the Disk driver. The corresponding partition is decided according to the property of the command or data in step 1101. For example, when the command is a command which the application layer software uses for managing the wireless Internet access module 200, the corresponding partition is an SD partition corresponding to the device management port 5031 of the wireless Internet access module 200; and when the data is data which the application layer software is required to transfer to the external network with the wireless Internet access module 200, the corresponding partition is an SD partition corresponding to the Modem port 5033 of the wireless Internet access module 200.

Through operations of the foregoing step 1101 to step 1103, the command or data of the application layer software may be written into an SD interface partition of the wireless Internet access module 200, thereby managing the wireless Internet access module 200, and using the wireless Internet access function of the wireless Internet access module 200.

Figure 11B:
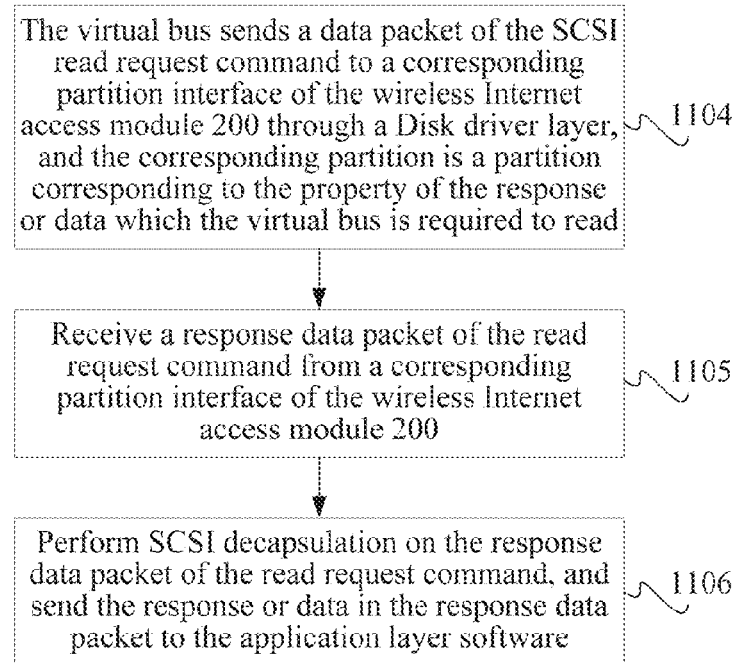
FIG. 11B is a flow chart of a method in which a PC side reads a response or data from a wireless Internet access module provided by this embodiment.

In the procedure of managing the wireless Internet access module 200 or using the wireless Internet access function of the wireless Internet access module 200, it is further required to receive a response from the wireless Internet access module 200, or receive data from the external network with the wireless Internet access module 200. This requires the application layer software to be capable of reading the data on the wireless Internet access module 200. This embodiment is implemented in a manner in which the virtual bus reads data through a corresponding SD card partition of the wireless Internet access module 200. For example, FIG. 11B shows a method in which a PC side reads a response or data from the wireless Internet access module 200 provided by this embodiment.

Step 1104: The virtual bus sends a data packet of the SCSI read request command to a corresponding partition of the wireless Internet access module 200 through a Disk driver layer, and the corresponding partition is a partition corresponding to the property of the response or data which the virtual bus is required to read. Similar to step 1103, for example, if what the virtual bus is required to read is a response of a command which the application layer software uses for managing the wireless Internet access module 200, the corresponding partition is an SD partition corresponding to the device management port 5031 of the wireless Internet access module 200; if what the virtual bus is required to read is data which the application layer software is required to receive from the external network with the wireless Internet access module 200, the corresponding partition is an SD partition corresponding to the Modem port 5033 of the wireless Internet access module 200. As an example, the data packet of the SCSI read request command may include a field used for indicating the operation type in the SCSI command which is assigned with a value corresponding to the read request, and a buffer address pre-allocated by the host side and used for buffering the read data or information used for indicating the address is encapsulated together therewith.

Step 1105: Receive a response data packet of the read request command from a corresponding partition interface of the wireless Internet access module 200. The response data packet of the read request command is encapsulated with a response of a command (such as, a device management command or dialing command) sent from the application layer software and reported by the wireless Internet access module 200 or data from an external network.

Step 1106: Perform SCSI decapsulation on the response data packet of the read request command, and send the response or data in the response data packet to the application layer software. If the encapsulation is performed according to the example in step 1104, the data decapsulation and sending may be: after decapsulation, recognizing this operation as a read operation according to the read request, and sending the data, required to be reported, to a buffer address pre-allocated by the host side.

Through operations of the foregoing step 1104 to step 1106, the response or data reported by the wireless Internet access module 200 to the application layer software may be reported through a corresponding port of the wireless Internet access module 200 via a virtual bus, thereby accomplishing the management of the wireless Internet access module 200, and the use of the wireless Internet access function of the wireless Internet access module 200. It can be understood that, the procedure shown in step 1101 to step 1103 of writing a command or data into the wireless Internet access module 200, and the procedure shown in step 1104 to step 1106 of reading a response or data from the wireless Internet access module 200 are corresponding procedures, but are unnecessarily required to be consecutive and corresponding in terms of time. For example, the write command in the step 1101 to step 1103 are unnecessarily responded in the read procedure shown in subsequent step 1104 to step 1106, while may be responded in a certain read procedure after several read procedures. Definitely, the procedures may also be consecutive and corresponding in terms of time.

It can be understood that, when the foregoing method is implemented, the virtual bus unit may further include an application layer interface subunit and an encapsulation subunit, in which the application layer interface subunit is configured to receive a command or data from the application layer; the encapsulation subunit is configured to encapsulate the command or the data into a data packet of a small computer system interface SCSI write request command; and the mapping subunit is configured to send the data packet of the SCSI write request command to the corresponding secure digital card partition of the wireless Internet access module. Further, the virtual bus unit further includes a read command generation subunit, and a decapsulation subunit, in which the read command generation subunit is configured to generate a data packet of a small computer system interface SCSI read request command; the mapping subunit is configured to send the data packet of the SCSI read request command to the corresponding secure digital card partition of the wireless Internet access module, and read a response data packet of the SCSI read request command from the secure digital card partition, in which the response data packet of the SCSI read request command is encapsulated with a response, to a command sent from the application layer, reported by the wireless Internet access module, or data from an external network; the decapsulation subunit is configured to perform SCSI decapsulation on the response data packet of the SCSI read request command; and the application layer interface subunit is configured to send the decapsulated response or data to the application layer. Further, the virtual bus unit further includes a judgment unit, configured to judge whether the SCSI write request command generated by the encapsulation subunit is processed successfully in the wireless Internet access module, and if successfully, trigger the read command generation subunit to generate the data packet of the SCSI read request command.

It can be understood that, the virtual bus described in the foregoing step 1101 to step 1106 may be replaced with a bus driver when the PC side driver structure shown in FIG. 9 is adopted. The described virtual serial port device and the virtual Modem device are the serial port device and modem device created by the bus driver according to the SD card partition information when the PC side driver structure shown in FIG. 9 is adopted. The virtual bus, the virtual serial port device, the virtual Modem device, and the virtual network port mentioned in each embodiment described in the following may also be replaced with reference to this corresponding relationship, thereby obtaining an embodiment when the PC side driver structure shown in FIG. 9 is adopted. For simplicity, no separate description is provided again.

Figure 12A:
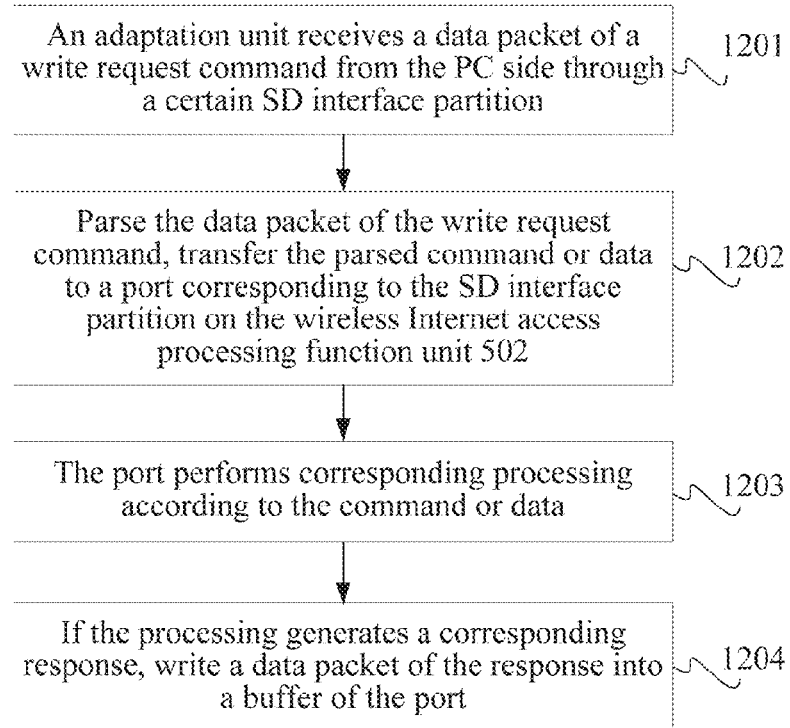
FIG. 12A is a flow chart of a method in which a wireless Internet access module performs processing according to a command or data delivered by a PC provided by this embodiment.

As described in the foregoing when a schematic functional structural diagram of the wireless Internet access module 200 shown in FIG. 5 is discussed, in the solution of the embodiment of the present invention, in a manner that the adaptation unit 505 is set in the wireless Internet access module 200, the correspondence between an SD interface partition and each port on the wireless Internet access processing function unit 502 in the wireless Internet access module 200 is implemented, and translation and transmission of a command or data are accomplished. Specifically, at a side of the wireless Internet access module 200, corresponding to the method shown in FIG. 11, the communication method for the wireless Internet access module 200 of the SD interface and the PC side is shown in FIG. 12A.

Step 1201: An adaptation unit receives a data packet of a write request command from the PC side through a certain SD interface partition. The certain partition is one of SD interface partitions reported by the adaptation unit to the PC side. The specific partition depends upon a partition through which the PC side delivers the data packet of the write request command. Specifically, reference may be made to the description of step 1103 in FIG. 11A.

Step 1202: Parse the data packet of the write request command, transfer the parsed command or data to a port corresponding to the SD interface partition on the wireless Internet access processing function unit 502. The data packet of the write request command is encapsulated in an SD interface format in the delivery procedure at the PC side, and the adaptation unit 505 decapsulates the data packet of the write request command, and parses the command or data in the data packet. For example, the command or data may be a command for managing the wireless Internet access module 200, or data which is required to be sent to the external network with the wireless Internet access module 200. According to different partition interfaces received in the data packet of the write request command in step 1201, the adaptation unit sends the partition interfaces to corresponding ports. The corresponding relationship between a partition interface and a port is already bound when the adaptation unit reports an SD interface partition to the PC side. For details, reference may be made to the foregoing corresponding part during the description of FIG. 6.

Step 1203: The port performs corresponding processing according to the command or data. The port may be the device management port 5031 or the Modem port 5033. The performing the corresponding processing according to the command or data may be: for example, if the command is a command sent to the device management port 5031 for managing the wireless Internet access module 200, the device management port 5031 performs a corresponding setting on the wireless Internet access module 200 according to the command. If the data is data sent to the Modem port 5033 and required to be sent to the external network, the Modem port 5033 performs modulation according to the data, and sends the modulated data packet.

Step 1204: If the processing generates a corresponding response, write a data packet of the response into a buffer of the port. It can be understood that, each operation does not necessarily generate response data, so this step is an optional step. The response may be an operation result response to an operation command, or a data response from the external network, or a data request from the external network. These responses may be regarded as responses of the command or data delivered by the application layer software. The buffer is a buffer allocated for each port by the adaptation unit 505 described in the foregoing step 604.

Through operations of the foregoing step 1201 to step 1204, the command or data from the PC side may be written into a corresponding port of the wireless Internet access module 200, thereby managing the wireless Internet access module 200, and using the wireless Internet access function of the wireless Internet access module 200.

Figure 12B:
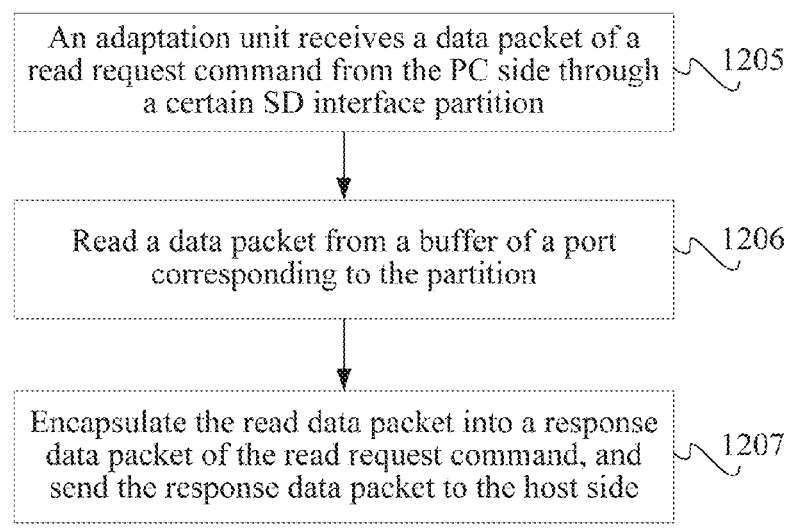
FIG. 12B is a flow chart of a method in which a wireless Internet access module reports a response or data to a PC side provided by this embodiment.

In the procedure of managing the wireless Internet access module 200 or using the wireless Internet access function of the wireless Internet access module 200, it is further required to report a response from the wireless Internet access module 200, or data received from the external network with the wireless Internet access module 200, to the PC side. FIG. 12B shows a method in which the wireless Internet access module 200 reports a response or data to a PC side provided by this embodiment.

Step 1205: An adaptation unit receives a data packet of a read request command from the PC side through a certain SD interface partition. The Step is similar to step 1201, and the difference is that a data packet of a read request command is received in this step.

Step 1206: Read a data packet from a buffer of a port corresponding to the partition. The data packet in the buffer is the data packet stored in step 1204. The data packet may be a data packet of an operation result response to an operation command, or a data packet of a data response from the external network, or a data packet of a data request from the external network.

Step 1207: Encapsulate the read data packet into a response data packet of the read request command, and send the response data packet to the host side.

Through operations of the foregoing step 1205 to step 1207, each port in the wireless Internet access processing function unit 503 in the wireless Internet access module 200 may report a response or data to the PC side with the adaptation unit 505, thereby accomplishing the management of the wireless Internet access module 200, and the use of the wireless Internet access function of the wireless Internet access module 200. It can be understood that, the procedure shown in step 1201 to step 1204, and the procedure shown in step 1205 to step 1207 are corresponding procedures, but are unnecessarily required to be consecutive and corresponding in terms of time. Definitely, the procedures may also be consecutive and corresponding in terms of time.

It can be understood that, with the application of the wireless Internet access module 200 of the SD interface, and the PC side driver structure disclosed by the embodiment of the present invention, by combining the method shown in FIG. 11 and the method shown in FIG. 12, the communication between the application layer software on the PC and each port in the wireless Internet access processing function unit 503 in the wireless Internet access module 200 may be implemented, thereby accomplishing the management of the wireless Internet access processing function unit 503 by the application layer software, and the use of the wireless Internet access function of the wireless Internet access module 200.

Figure 13:
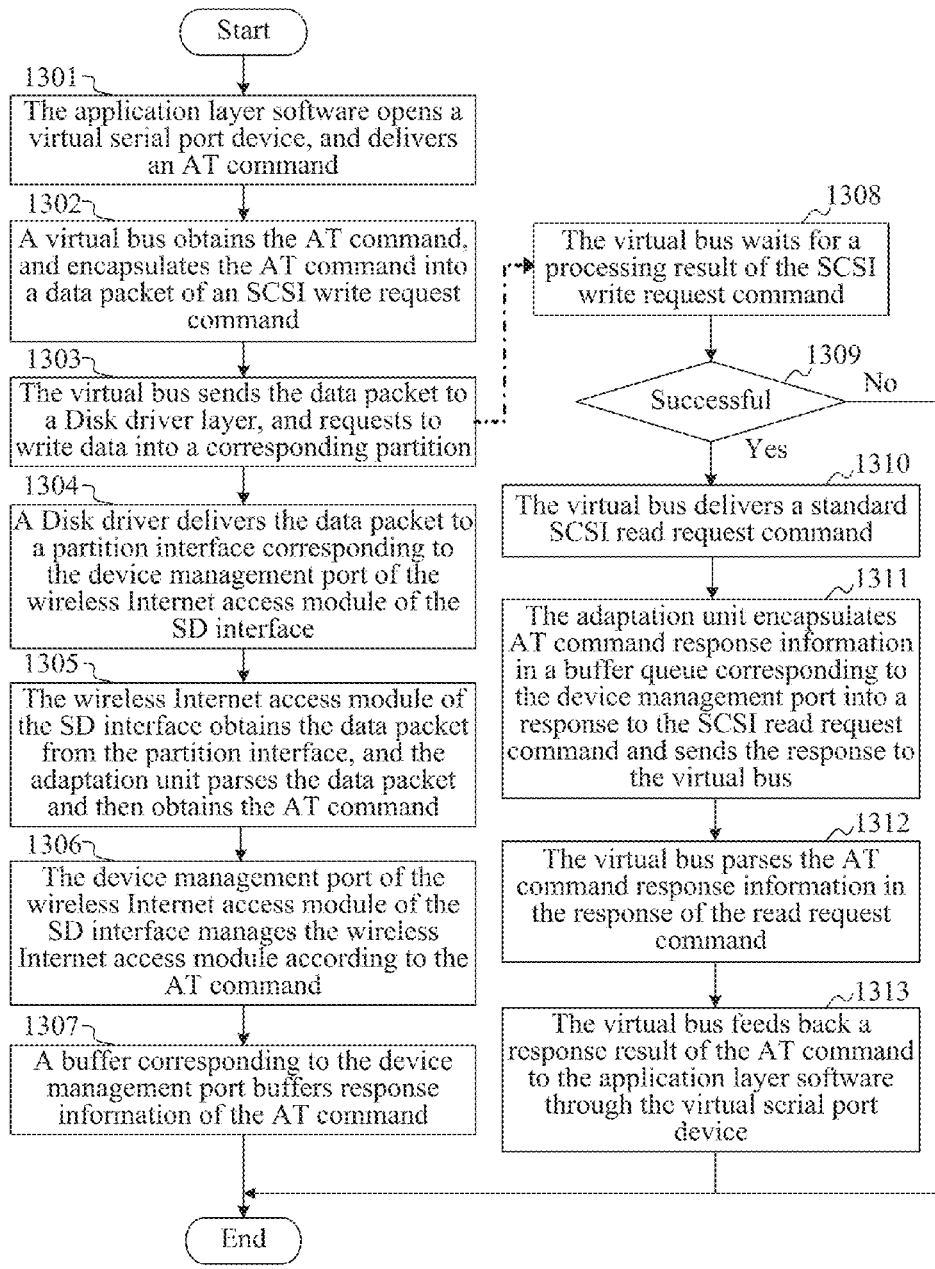
FIG. 13 is a flow chart of a method in which application layer software manages a wireless Internet access module of an SD interface through a virtual serial port device provided by this embodiment.
Figure 14A:
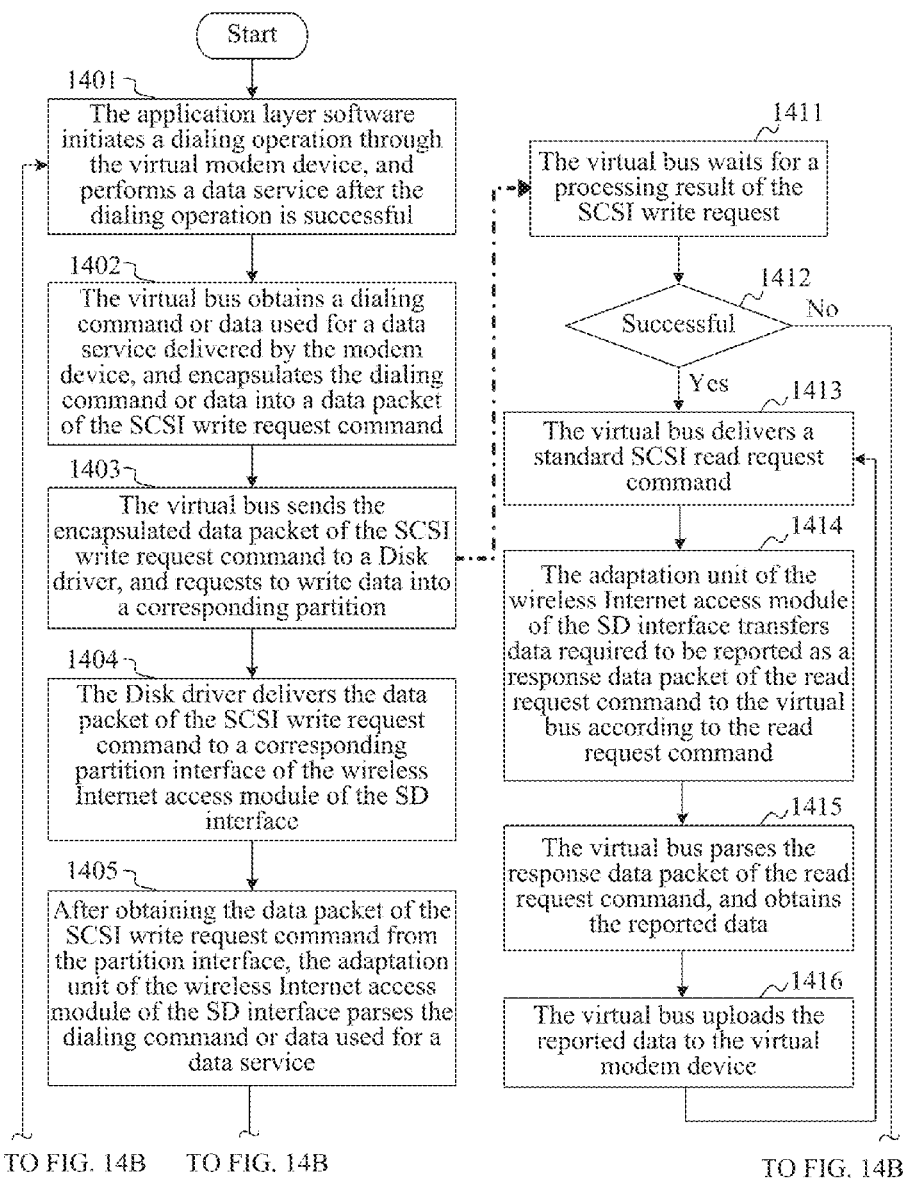
FIGS. 14A and 14B are a flow chart of a method in which application layer software performs a data service with a wireless Internet access module of an SD interface through a virtual Modem device provided by this embodiment.
Figure 14B:
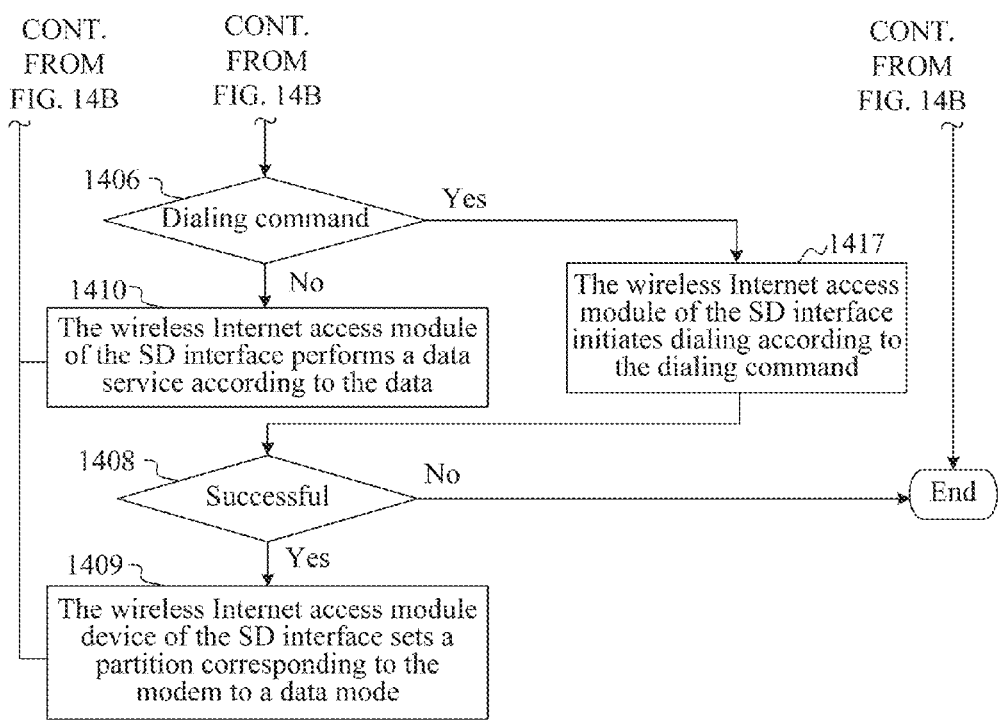

Next, FIG. 13 and FIG. 14 further provide an more specific embodiments, so as to more elaborately illustrate a method for using a wireless Internet access module 200 of an SD interface disclosed by the embodiment of the present invention.

FIG. 13 shows a method in which application layer software manages a wireless Internet access module 200 of an SD interface through a virtual serial port device.

Step 1301: The application layer software opens a virtual serial port device, and delivers an AT command. When the PC side driver structure shown in FIG. 8 or FIG. 9 is adopted, the application layer software, for example, Modem management software, sees a virtual serial port device and Modem device such as a serial port driver and a Modem driver. The AT commands (AT Commands) is a command language used for a modem. AT is Attention, and a user may control aspects such as a call, a short message, a contact list, a data service, and a fax through an AT instruction. At the beginning of the nineties, the AT instruction is only used for a Modem operation. There is no precedent for controlling a mobile phone text message, and only a protocol called SMS Block Mode is developed for complete control with a terminal device or computer. The protocol is invented by Hayes corporation, and currently has become a factual standard and a modem command language adopted by all modem manufacturers. Each command begins with letters "AT", contributing to the name thereof. AT is followed by letters and numbers for indicating specific functions. Years later, major mobile phone manufacturers such as Nokia, Ericsson, Motorola and HP (HP) jointly develop a whole set of AT instructions for GSM, which includes the SMS control. The AT instruction is evolved on this basis and is added into the GSM07.05 standard and the GSM07.07 standard. This embodiment does not limit which version of standard is adopted by the AT command or even whether a standard technology is adopted, as long as the wireless Internet access module 200 can be managed.

Step 1302: A virtual bus obtains the AT command, and encapsulates the AT command into a data packet of an SCSI write request command.

Step 1303: The virtual bus sends the data packet to a Disk driver layer, and requests to write data into a corresponding partition.

Step 1304: A Disk driver delivers the data packet to a partition interface corresponding to the device management port 5031 of the wireless Internet access module 200 of the SD interface.

Step 1305: The wireless Internet access module of the SD interface obtains the data packet from the partition interface, and the adaptation unit 505 parses the data packet and then obtains the AT command.

Step 1306: The device management port 5301 of the wireless Internet access module of the SD interface manages the wireless Internet access module 200 according to the AT command.

Step 1307: A buffer corresponding to the device management port 5301 buffers response information of the AT command. At this time, a command delivery process ends.

The subsequent steps are steps of reading the response to the command delivered in the foregoing step 1301 to step 1307. A corresponding relationship exists between the subsequent steps and the previous steps, but the steps are not required to be closely consecutive in terms of time, that is, the response to the command delivered in step 1301 to step 1307 is unnecessarily read in the following step 1308 to step 1313.

Step 1308: The virtual bus waits for a processing result of the SCSI write request command.

Step 1309: The virtual bus judges whether the SCSI write request command is processed successfully, and if successfully, the process proceeds to step 1310; and otherwise, the process of this method is ended. The judgment of whether the SCSI write request command is processed successfully is made in a manner in the SCSI command specification, for example, the judgment by use of an ACK packet.

Step 1310: The virtual bus delivers a standard SCSI read request command.

Step 1311: The adaptation unit 505 encapsulates AT command response information in a buffer queue corresponding to the device management port 5301 into a response to the SCSI read request command and sends the response to the virtual bus.

Step 1312: The virtual bus parses the AT command response information in the response of the read request command.

Step 1313: The virtual bus feeds back a response result of the AT command to the application layer software through the virtual serial port device.

Through the foregoing step 1301 to step 1313, the application layer software may manage the wireless Internet access module 200 of the SD interface.

FIG. 14 shows a method in which application layer software performs a data service with a wireless Internet access module 200 of an SD interface through a virtual Modem device.

Step 1401: The application layer software initiates a dialing operation through the virtual modem device, and performs a data service after the dialing operation is initiated successfully. In this step, the application layer software practically only selects either initiating a dialing operation or performing a data service in the procedure of delivering data once. The initiating a dialing operation may be: accepting an operation of a user to initiate dialing, or dialing in an automatic redial procedure, or automatic dialing after detecting that the network is disconnected, which is not limited in this embodiment. The data service is a service of exchanging a data message with the external network in a normal Internet access procedure.

Step 1402: The virtual bus obtains a dialing command or data used for a data service delivered by the modem device, and encapsulates the dialing command or data into a data packet of the SCSI write request command.

Step 1403: The virtual bus sends the encapsulated data packet of the SCSI write request command to a Disk driver, and requests to write data into a corresponding partition.

Step 1404: The Disk driver delivers the data packet of the SCSI write request command to a corresponding partition interface of the wireless Internet access module 200 of the SD interface. The corresponding partition interface is generally a partition interface corresponding to the Modem port.

Step 1405: After obtaining the data packet of the SCSI write request command from the partition interface, the adaptation unit 505 of the wireless Internet access module 200 of the SD interface parses the dialing command or data used for a data service.

Step 1406: The Modem port judges whether this operation is a dialing command. If it is the dialing command, the process continues to execute step 1407; and otherwise, it is a data service by default, and the process skips to step 1410.

Step 1407: The wireless Internet access module 200 of the SD interface initiates dialing according to the dialing command. Specifically, it is the Modem port 5031 in the wireless Internet access processing function module 503 on the wireless Internet access module 200 of the SD interface that initiates the dialing.

Step 1408: The wireless Internet access module 200 judges whether this dialing is successful, and if successful, the process continues to execute step 1409; and otherwise, this dialing is ended. Alternatively, if the wireless Internet access module 200 is configured with an automatic redialing function, this dialing may not be ended, and the process skips to step 1407 to repeat dialing, until the dialing is successful, or other dialing stop conditions set on the wireless Internet access module 200 are satisfied, for example, all consecutive 10 times of dialing fail.

Step 1409: The wireless Internet access module device of the SD interface sets a partition corresponding to the modem to a data mode. Moreover, the process proceeds to step 1401, and the application layer software may begin a data service.

Step 1410: The wireless Internet access module 200 of the SD interface performs a data service according to the data. Moreover, the process proceeds to step 1401, and the application layer software may continue to perform a data service according to the foregoing steps.

The subsequent steps are steps of reading the response of the dialing command or the data received from the external network in the data service delivered in the foregoing step 1401 to step 1410. A corresponding relationship exists between the subsequent steps and the previous steps, but the steps are not required to be closely consecutive in terms of time, that is, the response to the data delivered in step 1401 to step 1410 is unnecessarily read in the following step 1411 to step 1417.

Step 1411: The virtual bus waits for a processing result of the SCSI write request.

Step 1412: The virtual bus judges whether the SCSI write request command is processed successfully, and if successfully, the process proceeds to step 1310; and otherwise, the process of this method is ended. The judgment may also be performed in, for example, an ACK packet manner.

Step 1413: The virtual bus delivers a standard SCSI read request command.

Step 1414: The adaptation unit 505 of the wireless Internet access module 200 of the SD interface transfers data required to be reported as a response data packet of the read request command to the virtual bus according to the read request command.

Step 1415: The virtual bus parses the response data packet of the read request command, and obtains the reported data.

Step 1416: The virtual bus uploads the reported data to the virtual modem device.

Through the foregoing step 1401 to step 1417, the application layer software may initiate dialing for the wireless Internet access module 200 of the SD interface, and exchanges data with the external network through the wireless Internet access function of the wireless Internet access module 200.

Figure 15:
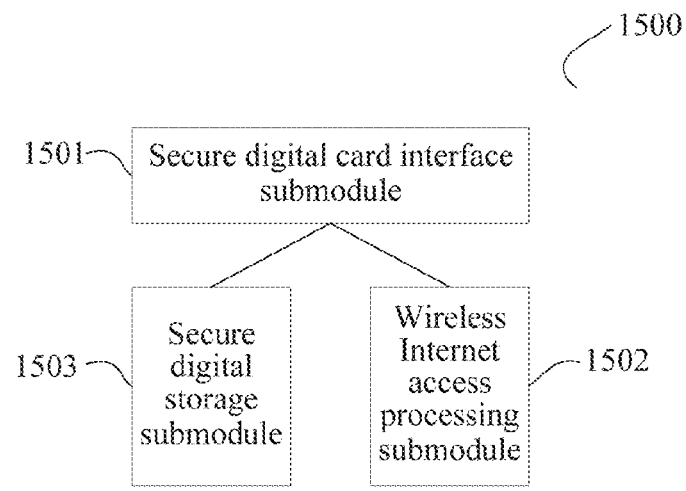
FIG. 15 is a schematic structural diagram of another wireless Internet access module disclosed by an embodiment of the present invention.
Figure 16:
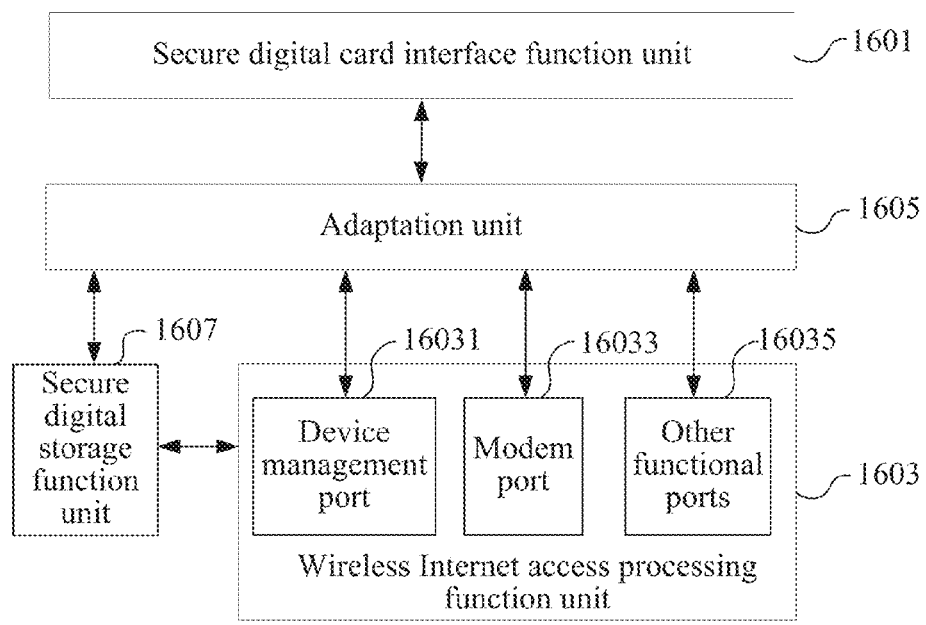
FIG. 16 is a schematic functional structural diagram of the wireless Internet access module shown in FIG. 15.

The wireless Internet access module 200 of the SD interface mentioned in each of the foregoing methods is the wireless Internet access module shown in FIG. 2, whose schematic functional structural diagram is shown in FIG. 5. Practically, the wireless Internet access module may be integrated with a storage function of an SD card. As shown in FIG. 15, a wireless Internet access module 1500 is formed of a secure digital card interface submodule 1501, a wireless Internet access processing submodule 1502 and a secure digital storage submodule 1503. The secure digital card interface submodule 1501 and the wireless Internet access processing submodule 1502 are the same as the secure digital card interface submodule 201 and the wireless Internet access processing submodule 202 shown in FIG. 2. The secure digital storage submodule 1503 is the same as the storage module of an SD card in the prior art. Correspondingly, a schematic functional structural diagram shown in FIG. 15 is as shown in FIG. 16. A secure digital card interface function unit 1601 and a wireless Internet access processing function unit 1603 are the same as the secure digital card interface function unit 501 and the wireless Internet access processing function unit 503 in FIG. 5, in which a device management port 16031, a Modem port 16033 and other functional ports 16035 in the wireless Internet access processing function unit 1603 are also the same as the device management port 5031, the Modem port 5033 and the other functional ports 5035 in the wireless Internet access processing function unit 503 in FIG. 5. A secure digital storage function unit 1607 shown in FIG. 16 is implemented by use of a storage function unit in an existing SD card. One or no communication channel may exist between the secure digital storage function unit 1607 and the wireless Internet access processing function unit 1603. The adaptation unit 1605 shown in FIG. 16, in addition to being equipped with the function of the adaptation unit 505 shown in FIG. 5, is further configured to report the secure digital storage function unit to the PC side as an SD interface partition of the wireless Internet access module 1500 of the SD interface, and in the procedure of exchanging data with the PC side, transparently transmit data delivered by the PC into an SD interface partition corresponding to the secure digital storage function unit, so as to implement the storage function of the existing SD card.

The wireless Internet access module 1500 of the SD interface may be used on hosts such as a PC and a smart mobile phone which may run application software to manage the wireless Internet access module. However, in many consumer electronics products (electronic products such as a camera and a digital photo frame) integrated with an SD slot or card reader but equipped with no complex device management and network management functions, the function of the device management port and the function of the Modem port of the wireless Internet access module 1500 of the SD interface will become unusable without the support of the application software at the host side, and the wireless Internet access module 1500 of the SD interface will become an ordinary SD card device.

Figure 17:
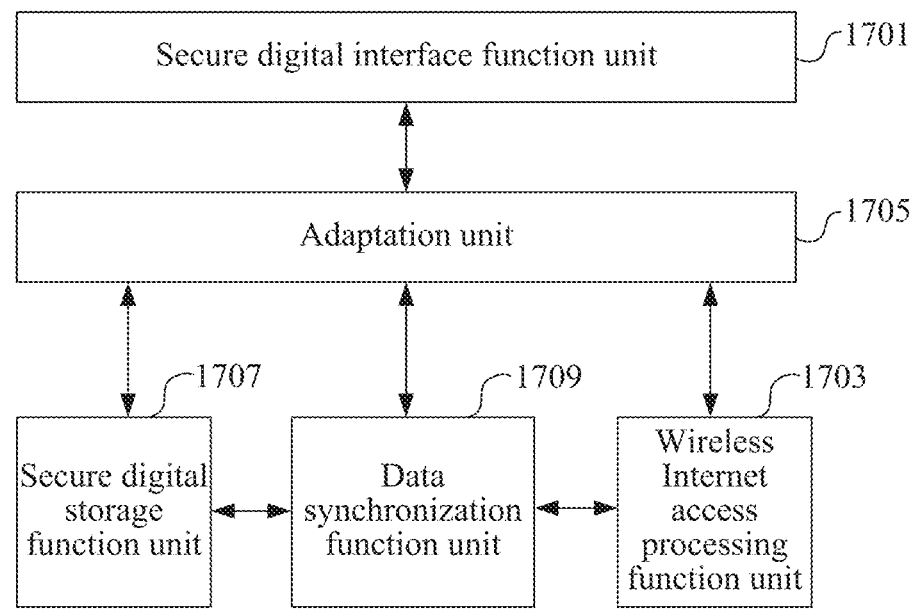
FIG. 17 is another schematic functional structural diagram of the wireless Internet access module shown in FIG. 15.

In order to enable ordinary consumer electronics products (electronic products such as a camera and a digital photo frame) to directly access the external network through the wireless Internet access device of the SD interface, so as to change the current situation that the data exchange between this type of consumer electronics products and a network has to depend on the use of a PC or smart mobile phone, an embodiment of the present invention further improves the wireless Internet access module 1500 of the SD interface. Referring to FIG. 17, it can be known through comparison with FIG. 16 that, on the basis of the functional structure of the wireless Internet access module 1500 of the SD interface shown in FIG. 16, in FIG. 17, a data synchronization function unit 1709 is added, and other functional units including a secure digital interface function unit 1701 and a secure digital storage function unit 1707 are the same as the secure digital interface function unit 1601 and the secure digital storage function unit 1607 in FIG. 16, respectively. The data synchronization function unit 1709 is configured to, when it is detected that data of the secure digital storage function unit 1707 or the external network space bound to the secure digital storage function unit 1707 is changed, synchronize the data according to a preset synchronization policy. Compared with the wireless Internet access processing function unit 1603, the improvement of the wireless Internet access processing function unit 1703 lies in performing automatic dialing automatically according to the preset dialing information under the circumstance of detecting that the wireless Internet access module 1500 is powered on. The adaptation unit 1705 is further required to report the data synchronization function unit 1709 as an SD partition, so that the host side may set the data synchronization function unit 1709, and preset the synchronization policy. It can be understood that, the presetting the synchronization policy on the data synchronization function unit 1709, and the presetting the dialing information on the wireless Internet access processing function unit 1703 may both adopt the methods in the foregoing embodiments where the PC side application software manages and sets the wireless Internet access module. That is to say, the preset synchronization policy and dialing information both require to be implemented first by using the wireless Internet access module first through the methods of the foregoing various embodiments in FIG. 2 to FIG. 16 on electronic devices (such as a PC or smart mobile phone) equipped with complex device management and network management functions.

After the synchronization policy is preset on the data synchronization function unit 1709, and the dialing information is preset on the wireless Internet access processing function unit 1703, the wireless Internet access module of the SD interface may be inserted into an SD card slot of an ordinary consumer electronics product (electronic products such as a camera and a digital photo frame) for use. In the following, a digital camera is taken as an example for the consumer electronics product to illustrate the use method.

Figure 18:
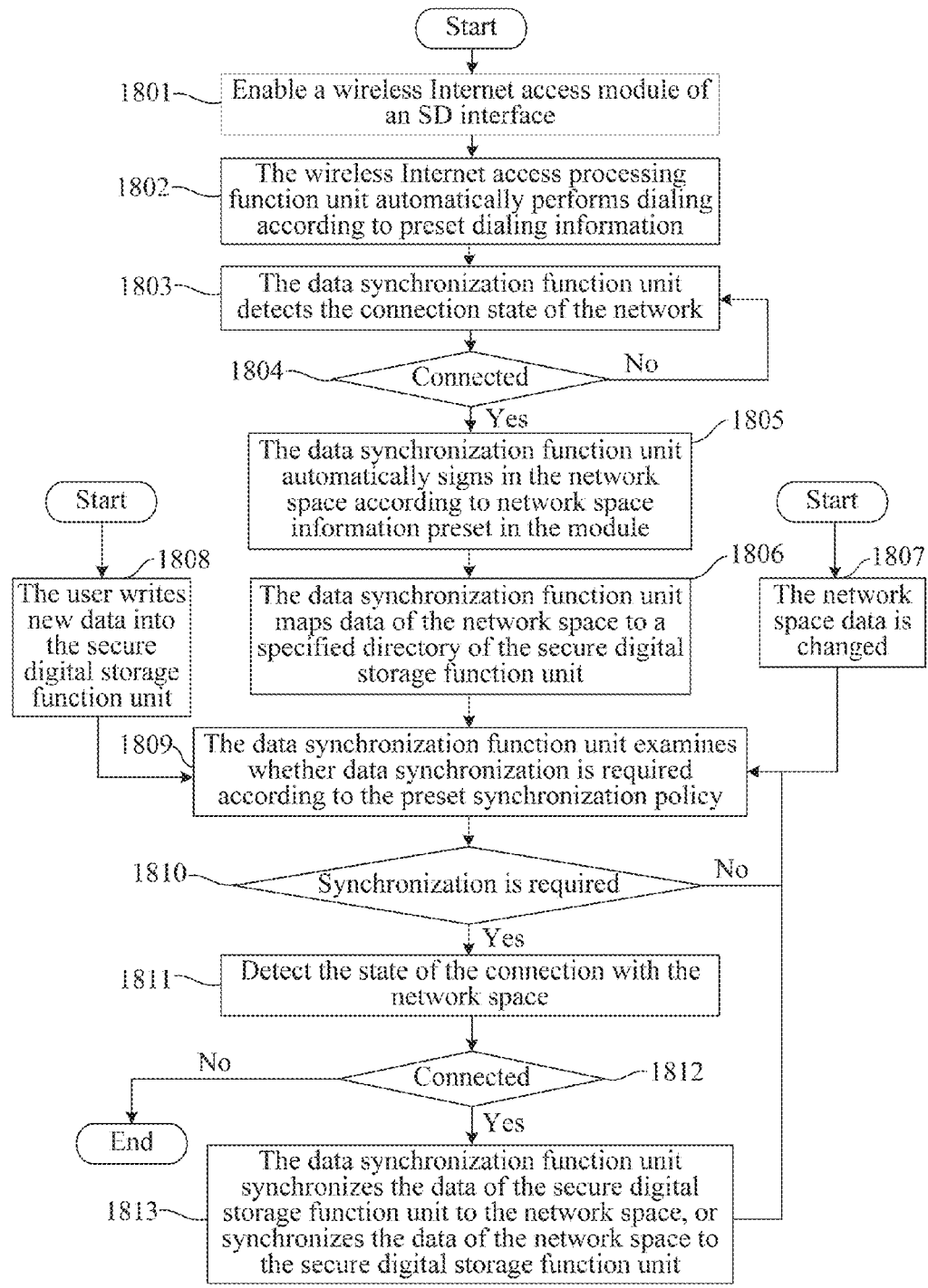
FIG. 18 is a flow chart of a method in which a wireless Internet access module adopting an SD interface synchronizes data of an electronic device and a network space disclosed by an embodiment of the present invention.

Refer to FIG. 18.

Step 1801: Enable a wireless Internet access module of an SD interface. The wireless Internet access module of the SD interface is inserted into an SD card slot of the digital camera, the power supply of the digital camera is switched on, and the wireless Internet access module of the SD interface may be enabled. Definitely, the operating system or hardware facility of the digital camera may also be set with an option about whether the SD interface device is activated, and at this time, a device with the SD interface activated needs to be selected, so that the wireless Internet access module of the SD interface can be enabled.

Step 1802: The wireless Internet access processing function unit 1703 automatically performs dialing according to preset dialing information.

Step 1803: The data synchronization function unit 1709 detects the connection state of the network.

Step 1804: If the network is already successfully connected, the process continues to execute step 1805; and otherwise, the process returns to step 1803.

Step 1805: The data synchronization function unit 1709 automatically signs in the network space according to network space information preset in the module. The network space may be, for example, a personal homepage, a QQ space, a Kaixin001 space, a Facebook account space, and an MSN account space of a user, or a certain space on a personal server, or a network space opened and shared by others.

Step 1806: The data synchronization function unit 1709 maps data of the network space to a specified directory of the secure digital storage function unit 1707. In this way, an operation on data in the specified directory may be synchronized to a network space mapped to the specified directory.

Step 1807: If the data synchronization function unit 1709 detects that the network space data is changed, step 1809 is executed.

Step 1808: If the data synchronization function unit 1709 detects that the user writes new data into the secure digital storage function unit 1707, step 1809 is executed.

When any one of the scenarios in step 1807 and step 1808 occurs, step 1809 is executed. Step 1809: The data synchronization function unit 1709 examines whether data synchronization is required according to the preset synchronization policy. The preset synchronization policy may be real-time synchronization, in which synchronization is initiated upon the change of any data in the network space and the secure digital storage function unit 1707; or timed synchronization, in which, for example, synchronization is initiated at three o'clock in the afternoon on the same day; or periodic synchronization, in which, for example, synchronization at eight o'clock in every Wednesday morning; or data directory synchronization, in which, for example, only data under a directory "my photo" in the secure digital storage function unit 1707 is synchronized with data under a directory "my photo album" in the network space; or data type synchronization, in which, for example, only a picture format document in the secure digital storage function unit 1707 is synchronized with a picture format document in the network space, while document format or audio/video media documents are not synchronized.

Step 1810: If synchronization is required, the process continues to execute step 1811; and otherwise, the process returns to step 1809.

Step 1811: The data synchronization function unit 1709 detects the state of the connection with the network space.

Step 1812: If the connection is normal, the process continues to execute step 1813; and otherwise, this synchronization operation is ended.

Step 1813: The data synchronization function unit 1709 synchronizes the data of the secure digital storage function unit 1707 to the network space, or synchronizes the data of the network space to the secure digital storage function unit 1707.

Through the application of the wireless Internet access module of the SD interface provided by the embodiment of the present invention, and by use of the method shown in FIG. 18, data of consumer electronics products (electronic products such as a camera and a digital photo frame) without the complex device management and network management functions and data of the network space may be directly synchronized without the use of an electronic device equipped with the Internet access terminal capability such as a PC or smart mobile phone.

The foregoing embodiments of the present invention introduce several wireless Internet access modules with an SD interface, and the structures of functional modules in the wireless Internet access modules are improved; a PC side driver structure improved by an embodiment of the present invention is adopted, so that the communication between the wireless Internet access module of the SD interface and the application layer software at the PC side may be implemented, and the application layer software may manage and set the wireless Internet access module of the SD interface, and access the external network with the wireless Internet access module. Further, the improved wireless Internet access module of the SD interface may be further integrated with a storage function of an SD card; the wireless Internet access module of the SD interface which is improved again may further enable the data on consumer electronics products (electronic products such as a camera and a digital photo frame) without the complex device management and network management function to be directly synchronized with that of the network space, thereby greatly improving user experiences and expanding wireless communication services. The wireless Internet access modules in the foregoing embodiments may all be set in a data card product which has a form of an encapsulating shape of a standard secure digital card or a micro secure digital card or a mini secure digital card, and includes a 9-pin secure digital card interface.

Persons of ordinary skill in the art should understand that all or a part of the steps of the methods according to the embodiments may be implemented by a program instructing relevant hardware. The program may be stored in a computer readable storage medium, and the storage medium may include a ROM, a RAM, a magnetic disk, or an optical disk.

The objectives, technical solutions, and beneficial effects of the present invention have been described in further detail through the foregoing specific embodiments. It should be understood that the foregoing descriptions are merely specific embodiments of the present invention, but not intended to limit the protection scope of the present invention. Any modification, equivalent replacement, or improvement made without departing from the spirit and principle of the present invention should fall within the protection scope of the present invention.

What is claimed is:

1. A wireless Internet access method for a host device, the method comprising:
   simulating, by a wireless Internet access module, a device management port and a modem port on a wireless Internet access processing function unit on the wireless Internet access module into a secure digital card partition and reporting the secure digital card partition to a host side;
   receiving, by the host side, information of the secure digital card partition reported by the wireless Internet access module;
   loading, by the host side, a serial port driver and a modem driver corresponding to the wireless Internet access module;
   encapsulating, by the host side, a command or data delivered by an application layer to the device management port or modem port into a secure digital card interface format;
   mapping, by the host side, the encapsulated command or data to a corresponding secure digital card partition of the wireless Internet access module; and
   receiving, by the wireless Internet access module, the command or data encapsulated in the secure digital card interface format from the host side;
   decapsulating, by the wireless Internet access module, the encapsulated command or data; and
   transferring, by the wireless Internet access module, the decapsulated command or data to the corresponding device management port or modem port;
   wherein simulating the device management port and the modem port and reporting the secure digital card partition to the host side comprise:
      obtaining configuration information of the device management port and the modem port of the wireless Internet access processing function unit;
      generating secure digital card partition information separately corresponding to the device management port and the modem port according to the configuration information;
      interacting with the host side according to an initialization process of a secure digital card; and
      reporting the secure digital card partition information to the host side.

2. The method according to claim 1, wherein transferring the decapsulated command or data is used to manage the wireless Internet access module through the device management port.

3. The method according to claim 1, wherein transferring the decapsulated command or data is used to implement dial-up Internet access through the modem port.

4. The method according to claim 1, further comprising:
   processing, by the device management port, a device management command or management data, wherein the command or data comprises the device management command or management data;
generating, by the device management port, response data;
processing, by the modem port, a dialing command or dialing data;
generating response data by the modem port or receiving data at the modem port from an external network, wherein the command or data delivered to the modem port comprises the dialing command or dialing data, or the data sent to the external network;
encapsulating, by the wireless Internet access module, the response data or the data from the external network into a data packet in the secure digital card interface format;
reading, by the host side, the data packet encapsulated in the secure digital card interface format;
decapsulating the data packet; and
reporting the response data in the data packet or the data from the external network to the application layer.

5. The method according to claim 4, wherein encapsulating the command or data comprises encapsulating the command or data into a data packet of a small computer system interface SCSI write request command.

6. The method according to claim 5, wherein encapsulating the response data or the data from the external network and reading the data packet encapsulated in the secure digital card interface format comprise:
delivering, by the host side, a data packet of an SCSI read request command that specifies to read the response data of a port or the data from the external network;
reading, by the wireless Internet access module, the response data of a response port or the data from the external network according to the SCSI read request command; and
encapsulating the response data or the data from the external network into a response data packet of the SCSI read request command and sending the encapsulated response data packet to the host side.

7. The method according to claim 6, wherein, before the host side delivers the data packet of the SCSI read request command, the method further comprises receiving, by the host side, a response to a result of successfully processing the SCSI write request command.

8. The method according to claim 1, wherein the wireless Internet access module further simulates other ports on the wireless Internet access processing function unit into a secure digital card partition and reports the secure digital card partition to the host side.

9. The method according to claim 8, wherein the host side receives information of the secure digital card partition of other ports reported by the wireless Internet access module then loads a corresponding driver.

10. The method according to claim 9, further comprising encapsulating a command or data delivered by the application layer to the other ports into a secure digital card interface format and mapping the encapsulated command or data to a corresponding secure digital card partition of the wireless Internet access module.

11. The method according to claim 10, wherein the wireless Internet access module receives the command or data encapsulated in the secure digital card interface format from the host side, decapsulates the received command or data, and transfers the decapsulated command or data to other corresponding ports.

12. The method according to claim 1, wherein the wireless Internet access module further uses a secure digital storage function unit on the wireless Internet access module as at least one partition of a secure digital card and reports the at least one partition to the host side; and
wherein the host side operates the secure digital storage function unit according to a storage operation method for a secure digital card partition.

13. A wireless Internet access system, comprising:
a host device;
a data card that is provided with an antenna, a radio frequency unit, and a baseband processor, wherein the data card communicates with the host device by use of a secure digital interface and comprises a wireless Internet access module;
wherein the wireless Internet access module is configured to simulate a device management port and a modem port on a wireless Internet access processing function unit on the wireless Internet access module into a secure digital card partition and report the secure digital card partition to the host device;
wherein the host device is configured to receive information of the secure digital card partition reported by the wireless Internet access module, to load a serial port driver and a modem driver corresponding to the wireless Internet access module, to encapsulate a command or data delivered by an application layer to the device management port or modem port into a secure digital card interface format, and to map the encapsulated command or data to a corresponding secure digital card partition of the wireless Internet access module; and
wherein the wireless Internet access module is configured to receive the command or data encapsulated in the secure digital card interface format from the host device, to decapsulate the encapsulated command or data, and to transfer the decapsulated command or data to the corresponding device management port or modem port, so as to manage the wireless Internet access module through the device management port or implement dial-up Internet access through the modem port;
wherein being configured to simulate the device management port and the modem port and report the secure digital card partition to the host side comprise:
being configured to obtain configuration information of the device management port and the modem port of the wireless Internet access processing function unit;
being configured to generate secure digital card partition information separately corresponding to the device management port and the modem port according to the configuration information;
being configured to interact with the host side according to an initialization process of a secure digital card; and
being configured to report the secure digital card partition information to the host side.

14. The system according to claim 13, wherein the command or data delivered to the device management port comprises a device management command or management data;
wherein the device management port of the wireless Internet access module is configured to process the device management command or management data and to generate response data;
wherein the command or data delivered to the modem port comprises a dialing command or dialing data, or data sent to an external network;
wherein the modem port of the wireless Internet access module is configured to process the dialing command or dialing data and to generate response data, or, receive the data from the external network;
wherein the wireless Internet access module is further configured to encapsulate the response data or the data from the external network into a data packet in the secure digital card interface format; and wherein the host device is further configured to read the data packet encapsulated in the secure digital card interface format, to decapsulate the data packet and to report the response data in the data packet or the data from the external network to the application layer.

* * * * *